United States Patent
Mannion et al.

(10) Patent No.: US 6,927,779 B2
(45) Date of Patent: Aug. 9, 2005

(54) WEB-BASED WELL PLATE INFORMATION RETRIEVAL AND DISPLAY SYSTEM

(75) Inventors: David P. Mannion, Davis, CA (US); Gina M. Truesdell, Davis, CA (US)

(73) Assignee: Large Scale Biology Corporation, Vacaville, CA (US)

( * ) Notice: Subject to any disclaimer, the term of this patent is extended or adjusted under 35 U.S.C. 154(b) by 397 days.

(21) Appl. No.: 10/145,652

(22) Filed: May 13, 2002

(65) Prior Publication Data

US 2003/0210245 A1 Nov. 13, 2003

(51) Int. Cl.[7] ............................. G09G 5/02; G09G 5/12; G06F 17/40
(52) U.S. Cl. ...................... 345/594; 345/650; 715/700; 715/737
(58) Field of Search ............................. 345/594, 650, 345/700, 737

(56) References Cited

U.S. PATENT DOCUMENTS

| | | | |
|---|---|---|---|
| 6,521,453 B1 * | 2/2003 | Crameri et al. | 435/440 |
| 6,531,316 B1 * | 3/2003 | Patten et al. | 435/455 |
| 6,759,206 B1 * | 7/2004 | Rubin et al. | 435/7.2 |
| 2002/0156253 A1 * | 10/2002 | Curtis et al. | 536/23.1 |
| 2003/0096322 A1 * | 5/2003 | Giuliano et al. | 435/7.21 |
| 2003/0124527 A1 * | 7/2003 | Schlager et al. | 435/6 |
| 2003/0162176 A1 * | 8/2003 | Edwards et al. | 435/6 |

FOREIGN PATENT DOCUMENTS

WO  WO 01/16375 A2 *  8/2001

OTHER PUBLICATIONS

Jaap Heringa, *Two Strategies for Sequence Comparison: profile–preprocessed and secondary structure–induced multiple alignment*, Computers and Chemistry (Jun. 1999) 23:341–364. Elsevier Science Ltd., UK.

(Continued)

*Primary Examiner*—Jeffery Brier
*Assistant Examiner*—Javid Amini
(74) *Attorney, Agent, or Firm*—John C. Robbins; Lucian Wayne Beavers; Waddey & Patterson

(57) ABSTRACT

A graphical user interfaces (GUI) depicts multiple wells of a well plate that represents biological samples stored in an actual well-plate. Each well includes visual representations of data that corresponds to results of analyses of the corresponding biological sample. For instance, in each well depicted in the GUI, several numbers are displayed. One number corresponds to an identifier designated by a LIMS (laboratory information management system) for the identification of the biological sample. Another alpha-numeric display in the well corresponds to a BLAST hit that correlates the analyzed biological sample to a sequence listed in the public BLAST database. Further, color and/or grey scale backgrounds in a portion or portions of each well provide an indication of the reliability of the displayed data in that well. Portions of the data displayed in each well are further linked to other pages in the GUI thereby providing a means to access various aspects of the retrieved and displayed indications of the data.

16 Claims, 21 Drawing Sheets

OTHER PUBLICATIONS

W. James Kent, et al., *The Human Genome Browser at UCSC,* Genome Research, (May 2002) 12:996–1006, Cold Spring harbor laboratory Press, USA.

W. James Kent, *Blat—The Blast–Like Alignment Tool,* Genome Research (Mar. 2002) 12:656–664, Cold Spring Harbor Laboratory Press, USA.

Chakravarti, et al., *Informatic Tools for Proteome Profiling,* Computational Proteomics, supplement to Biotechniques, vol. 32, p. S4–S15 (Mar. 2002).

David Gordon, et al., *Consed: A Graphical Tool for Sequence Finishing,* Genome Research (1998) 8:195–202, Cold Spring Harbor Laboratory Press, USA.

Brent Ewing, et al., *Base–Calling of Automated Sequencer Traces Using Phred. I. Accuracy Assessment,* Genome Research (1998) 8:175–185, Cold Spring Harbor Laboratory Press, USA.

Brent Ewing, et al., *Base–Calling of Automated Sequencer Traces Using Phred. II. Error Possibilities,* Genome Research (1998) 8:186–194, Cold Spring Harbor Laboratory Press, USA.

\* cited by examiner

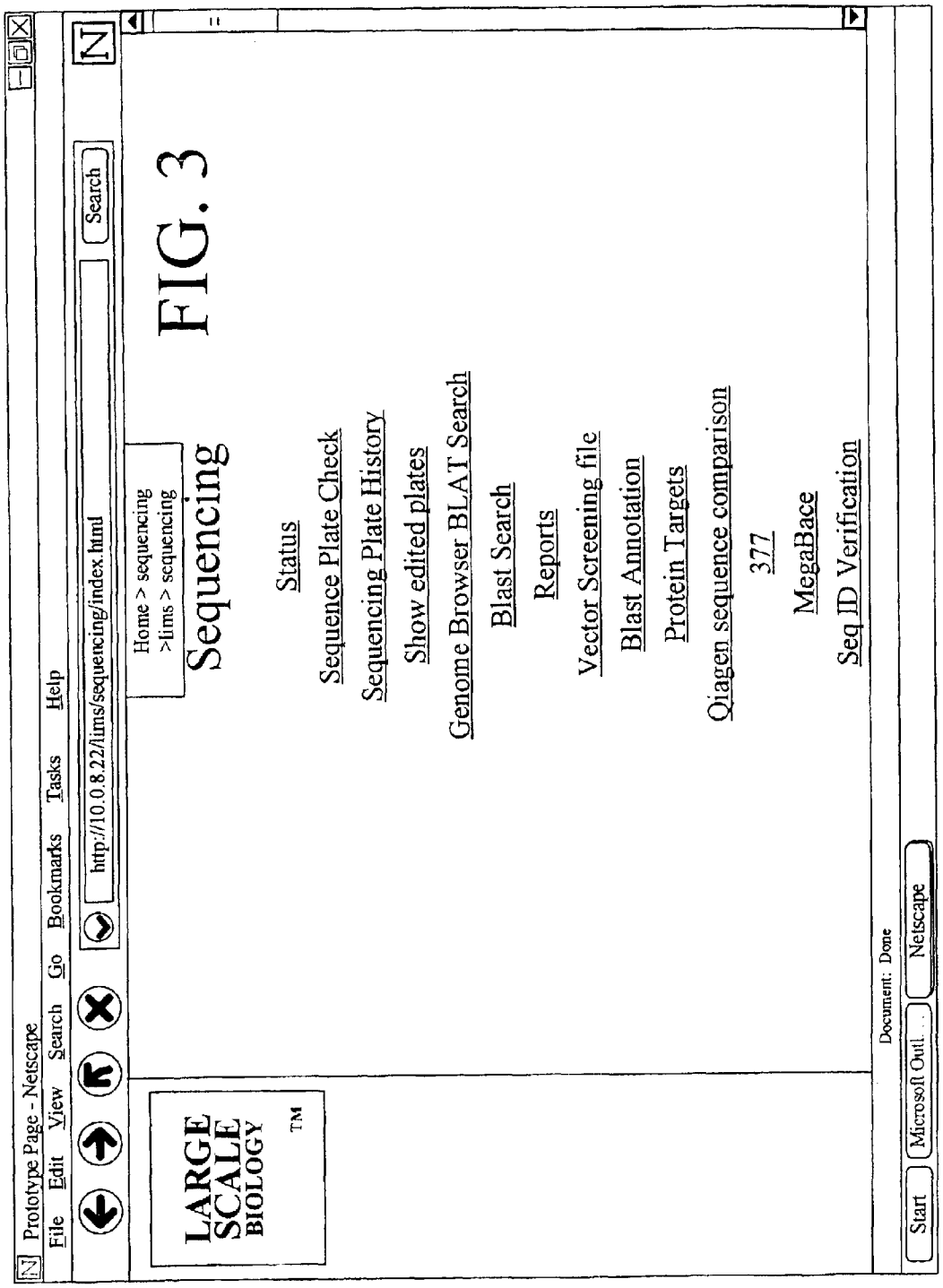

FIG. 4A

Refresh ☐ auto reload ☐ manage

Status @ 11:05:19 04-08-2002

Chromatograms

Running

| processed | queued | hold | problem |
|---|---|---|---|
| 400583Run01 | | | 45027 |
| 400582Run01 | | | 500298Run01 |
| 500588Run01 | | | 400509Run01 |
| 400588Run01 | | | 500468Run01 |
| | | | 400453Run01 |
| | | | 400452Run01 |
| | | | 400450Run01 |

Blast

Running

| processed | queued |
|---|---|
| 500588 | 400482 nr 1 00:14:51:341655 mechanic01 |
| 400588 | 400483 nr 1 00:11:45:955287 mechanic01 |
| 500587 | |
| 400487 | |
| 400586 | |
| 500586 | |
| 500584 | |

FIG. 4B

LARGE SCALE BIOLOGY™

Sequencing Plate Check: ☐ Show all for same dna-barcode

*Enter seqbarcode or dnabarcode*

[ Get Report ]

Related Links
- blank

FIG. 8A

LARGE SCALE BIOLOGY™

Related Links
• blank

1302469_400464_1 Information

[Chromatogram] [Explain] [Align Seqids]

*Sequence qualified by LIMS*

LIMS Sequence and Phred Quality

LIMS Sequence and Phred Quality >= 20

```
GAAAAGGAATGGCTTGCAGACAGAAGCTTCTAGTTGAGAAGATGAACATTCATGTTGAGAAGTGGCTTTC
AAGTTCCTACAGAGAGTCCAGACAGGTTCCGTGTTCAGAGAAGTTCTGTTCAGAGAAGAACTTGTCAGATAAA
ACATGCCGTGAAGAGTACAGAGGTTGACCAAGTTGACCAAGTTACAAGTTCTTCTTGACAATGTCAGAATC
ATCTTTGACTTTATCTATAAGAATCTGCCCGGATTACTTGGGAACTCTGTGTTACAAGAGTCTGCAGGCGCCAGTTGTAAACTGCTGTTC
AATCCACTAACACAACTAGCCCGGATTACTTGGGAGCTTCATGGGAGCCTCTGCAGGGCCCAGTCGGTATTGTGCCTGTGGTGA
TCCACTCAAGGAATATTCTCTTGGAAACAGAGTCAGAAGAAACACACCTGTATTGTGCCTGTGGTGA
ATAGCTATCTGAAATGGGAATATTCCTACAGAGTTAATGTTAGAGAGATTAGCGGGCAAATGTGGTCAACTTTAAACAGCCG
ATGAACTGTTTACTTGCATATATAAAAGCATCATAAATTTTCACCACCTTTATCAATCTTGTGAAAATCCAATGAC
GTCCAGTTTCTGAACAGATTCTAACAGATTCTAACACTTCTTAAGCACTCTTAAGCACTCTTAAGCACTCTTAAGCACGTCTTAAG
ATCCAAG
```

FASTA

```
>1302649_400464_1    2002-03-07 09:04:19.632318-08

GAAAAGGAATGGCTTGCAGACAGAAGCTTCTAGTTGAGAAGATGAACATTCATGTTGAGAAGTGGCTTTC
AAGTTCCTACAGAGAGTCCAGACAGGTCCGTGTTCAGAGAAGAAGTTCTGTTCAGAGAAGAACTTGTCAGATAAA
ACATGCCGTGAAGAGTACAGAGGTTGACCAAGTTGACCAAGTATAGAAGCAAATTCTTTCTTGCTGCTCAATGTCAGAATC
ATCTTTGACTTTATCTATAAGAATCTGCCCGGATTACTTGTGTTGGGAGCTTCATGGGAGCCTGCAGGCCCAGTTGTAAACTGCTGTTC
TCCACTCAAGGAATATTCTCTTGGAAACAGAGTCAGAAGAAACACACATCGTGATTGTGCCTGTGGTGA
ATAGCTATCTGAAATGGGAATATTCCTACAGAGTTAATGTTAGAGAGATTAGCGGCAAATGTGGTCAACTTTAAACAGCCG
TCATCAGAATGGGAATATTCCTACAGAGTCATATAAATCAAAGCATCATAAATTTCACCACCTTTATGTGCCTGTGGTGA
ATGAACTGTTTACTTGCATATAATCAAAGCATCATAAATTTCACCACCTATCAATGTTGCCTCCAG
GTCCAGTTTCTGAACAGATTCTAACAGATTCTAACACTTCTTAAGCACTCTTAAGCACGTCTTAAG
ATCCAAG
```

FIG. 8B

FASTA
>1302649_400464_1   2002-03-07 09:04:19.632318-08

GAAAAGGAATGGCTTGCAGACAGAAGCTTCTAGTTGAGAAGATGAACATTCATGTTGAGAAGTGGCTTTC
AAGTTCCTACAGAAGAGGTCCACATGTCCGTGTTCAGAGAAAGGTTCTGTTAAAGAACTTGTCAGATAAA
ACATGCCGTGAAGAGTACAGACAAGTTGACCAAGTATAGAAGCAAATTCTTTCTTGACAATGTCAGAATC
ATCTTTGACTTTATCTATAAGAATCTTGGGAACTTCACAAGAATTCTGCGTGCAGAATAAGATAAAA
AATCCACTAACACAACTAGCCCGGATTACTTCATGGGAGCTCTGCAGGGCCCAGTTGTAAACTGCTGTTC
TCCACTCAAGGAATATTCTTCTTGGAAACAGAGTCAGAAGATTAGCGGCAAATGTGGTCAACTTAAACAGCCG
ATAGCTATCTGAAATCCTACAGCTTAATGTTAGAAGATGAGAGCATTCCACATAAATCTTCCAGAATATCTTCAA
TCATCAGAATGGGAATAAATCCATGGAAGTGAGAGCATTCCACATAAATCTTCCAGATATGTCTTCCAA
ATGAACTGTTTACTTGCATATAAATCAAAGCATCATAAATTTCACCACCTTATCAATGGTTGCCTCCAG
GTCCAGTTTCTGAACAGATTCTAACAAACTTCTACAGCTCTTAAGCACTTTTGTGTAAAATCCAATGAC
ATCCAAG

NCBI Blast Hits for seqid 1302649 (includes all seqbarcodes and runs for this seqid)

| Hitcount | seqid | barcode | run | method | database | hit_id | Hit_accession | |
|---|---|---|---|---|---|---|---|---|
| 1 | 1302649 | 400454 | 1 | blastx | nr | gi\|4502325\|ref\|NP_001175 | NP_001175 | (NM_001184) ataxia telan |
| 2 | 1302649 | 400454 | 1 | blastx | nr | gi\|1235902\|gb\|AAC50405.1 | AAC50405 | (U49844) FRAP-related |
| 3 | 1302649 | 400454 | 1 | blastx | nr | gi\|11692798\|gb\|AAG40002.1\|AF320125.1 | AAG40002 | (AF320125) ataxia telang |
| 4 | 1302649 | 400454 | 1 | blastx | nr | gi\|11385422\|gb\|AAG34794.1 AF223644.1 | AAG34794 | (AF223644) Atr protein |
| 5 | 1302649 | 400454 | 1 | blastx | nr | gi\|15644760\|ref\|NP_206920.1 | NP_206930 | (NM_000915) hypothetical |
| 1 | 1302649 | 500454 | 1 | blastx | nr | gi\|1235902\|gb\|AAC50405.1 | AAC50405 | (AAC50405) FRAP related |
| 2 | 1302649 | 500454 | 1 | blastx | nr | gi\|4502225\|ref\|NP_001175.1 | NP_001175 | (NM_001184) ataxia telan |
| 3 | 1302649 | 500454 | 1 | blastx | nr | gi\|11692798\|gb\|AAG40022.1 AF320125.1 | AAG40002 | (AF320125) ataxia telang |
| 4 | 1302649 | 500454 | 1 | blastx | nr | gi\|11385422\|gb\|AAG34794.1 AF223644.1 | AAG34794 | (AF223644) Atr protein |
| 5 | 1302649 | 500454 | 1 | blastx | nr | gi\|15557\|sp_P16640\|CAMA PSEPU | P16640 | PUTIDAREDOXIN REDUCTASE |

Old WU Blast

| seqid | score | pvalue | hit | annotation | querystart | querystop | identity | homology | database |

BLAT Search Human Genome

[hg 10 ▼] [BLAT's guess ▼] [query, score ▼] [hyperlink ▼] [blat]

FIG. 9

LARGE SCALE BIOLOGY ™

Related Links
• blank

1302469_400464_1 Information

[Chromatogram] [Explain] —94 [Align Seqids] —96

*Sequence qualified by LIMS*

LIMS Sequence and Phred Quality

Base Quality - mean: 38.84, sd: 11.91

BLAT Search Results

| ACTIONS | QUERY | SCORE | START | END | QSIZE | IDENTITY | CHRO | STRAND | START | END |
|---|---|---|---|---|---|---|---|---|---|---|
| browser details | 1317214_500681_1 | 621 | 0 | 625 | 655 | 100.0% | 12 | - | 59334688 | 59337703 |
| browser details | 1317214_500681_1 | 621 | 0 | 625 | 655 | 100.0% | 12 | - | 59356312 | 59359326 |
| browser details | 1317214_500681_1 | 614 | 0 | 655 | 655 | 97.0% | 3 | - | 162447877 | 162448531 |
| browser details | 1317214_500681_1 | 581 | 0 | 655 | 655 | 93.9% | 6 | - | 118666735 | 118667386 |
| browser details | 1317214_500681_1 | 565 | 0 | 655 | 655 | 93.3% | X | - | 114485773 | 114486426 |
| browser details | 1317214_500681_1 | 561 | 15 | 655 | 655 | 93.8% | 9 | - | 81371422 | 81372059 |
| browser details | 1317214_500681_1 | 503 | 10 | 655 | 655 | 90.8% | 18 | - | 25981054 | 25981702 |
| browser details | 1317214_500681_1 | 501 | 96 | 655 | 655 | 95.0% | 20 | - | 12315668 | 12316231 |

Related Links
- blank

FIG. 12

Alignment of
1317314_50

1317314_500
genomic
block 1
block 2
block 3
block 4
block 5
together

Alignment of 1317314_500581_1 and chr12:59334688-59337703

Click on links in the frame to the left to navigate through alignment. Matching bases in cDNA and genomic sequences are colored blue and capitalized. Light blue bases indicate gaps in the alignment.

```
cDNA 1317314_500581_1

CGCTCCCTTG CTTGCTCGCG CTTTCGCTCG CCCTCTCCTC GAGGATCGAG   50
GGGACTCTGA CCACAGCCTG TGGCTGGGAA GGGAGACAGA GGCGGCGGCG  100
GCTCAGGGGA AACGAGGCTG CAGTGGTGGT AGTAGGAAGA TGTCGGGCGA  150
GGACGAGCAA CAGGAGCAAA CTATCGCTGA GGACCTGGTC GTGACCAAGT  200
ATAAGATGGG GGGCGACATC GCCAACAGGG TACTTCCGTC CTTGGTGGAA  250
GCATCTAGCT CAGGTGTGTC GGTACTGAGC CTGTGTGAGA AAGGTGATGC  300
CATGATTATG GAAGAAACAG GGAAAATCTT CAAGAAAGAA AAGGAAATGA  350
AGAAAGGTAT TGCTTTTCCC ACCAGCATTT CGGTAAATAA CTGTGTATGT  400
CACTTCTCCC CTTTGAAGAG GGACCAGGAT TATATTCTCA AGGAAGGTGA  450
CTTGGTAAAA ATTGACCTTG GGGTCCATGT GGATGGCTTC ATCGCTAATG  500
TAGCTCACAC TTTTGTGGTT GATGTAGCTC AGGGGACCCA AGTAACAGGG  550
AGGAAAGCAG ATGTTATTAA GGCAGCTCAC CTTTGTGCTG AAGCTGCCCT  600
ACGCCTGGTC AAACCTGGAA ATCAGaacac acaagtgaca gaagcctgga  650
acaaa Genomic chr12 (reverse strand):

cgagagcggc tagagtctgg cggccgagag gactagttgt cccagcgtgc  59337754
cctgcgcctc agcccgcgcg ctcgcagctt ctcgctctcg cctgcctgcc  59337704
CGCTCCCTTG CTTGCTCGCG CTTTCGCTCG CCCTCTCCTC GAGGATCGAG  59337654
GGGACTCTGA CCACAGCCTG TGGCTGGGAA GGGAGACAGA GGCGGCGGCG  59337604
GCTCAGGGGA AACGAGGCTG CAGTGGTGGT AGTAGGAAGA TGTCGGGCGA  59337554
GGACGAGCAA CAGGAGCAAA CTATCGCTGA GGACCTGGTC GTGACCAAGT  59337504
ATAAGATGGG GGGCGACATC GCCAACAgtg agtgcggcct cggggtcgg   59337454
ggaatcaagg ctgataggga aagtaacag gctggccgg aaggggctgg    59337404
agcggagggg tcatgcggac tgagctactg agtgggcccgc accggtccgc  59337354
tgggcacggc gtggtgggaa gacccggtgt cgcgcctggg acctgagcgg   59337304
gcaggccag gctgaagtct atggaggtgc gggtcggcga ccaggatgag    59337254
cgcagagagg ggaccctggc aggctccgac ccgaggccgt ttgttaggag   59337204
gcaagacgtg ttttctcttg ttcctatcct tcattccga ttattgcttc    59337154
ctctgattct ggcagcggcg aggccacctc gaaaaggaag cgcccagcta   59337104
ttggcgacag aagtgccct ctgttttgt agcgtctccg gggcgtcagg     59337054
agccaagccg gcacgtgttg ctgggtccca ttgcggatgg ctggccccct   59337004
tcttactccg ctagtgtccc tgacaccagc ttccccacca ccagcttccc    59336954
caccacgtgc tttgctggag cctttccttc tttacttcag ctcttaccct    59336904
ggtggggcc cccttctacc ttgggccagc taaggagacc gttggagagc    59336854
actcctggag cttctaatgc aagtcttgga gatatatatg gcttttcttg   59336804
aagttactca ttactaccac ctttccaatc tgtgcagata gtcttagtta   59336754
gcattcacat ttgttgttct cagtgacttg acaactcaaa tgttttgggg   59336704
tctccgtctt atcccaacta ggcaagcttg tgaacattac tggaaaaggg   59336654
aggactgatt ttaggatttt cacaagtcat ccttactcca ggtgtgctct    59336604
gacgatctca gcagttgcct gtcactctag gcagatgcca ctttctcttt    59336554
tctctcttc cagttagcct ttccatttta tccagttag ggagatacaa     59336504
actgcttgtc attgtgcttt taaatggttt taacagcaaa gatggtgggg    59336454
aacaggtatt taggatgcct cccgtcctgt gggtgaaat ctgagttta     59336404
ccagctttca aagaatcacc aaaactgaga taccaaaagt caaacctgtg    59336354
ctttatatca cagtggacat ttagtatcgt accctggttt ttggtgcctt    59336304
ttagtatttg agatactagt ggtttgaatc agaaaatctc ttacagttta   59336254
taactttgc ctcatatttc ttttagataa gccatgatcc cccgaaatga     59336204
aacccaggga ccttagatta agtttccttg gcttatgcac ttgtttatga    59336154
ggaaataagt ctatatagat tgagattcct aacacctaat tagagtgtct   59336104
```

Prototype Page

LARGE SCALE BIOLOGY

NCBI                                                                    Protein

Related Links
• blank

```
 1: NP_001175.ataxia telangiect...[gi:4502325] Nucleotide, OMMIM Related Sequences, PubMed, Taxonomy, BLink, LinkOut
LOCUS       ATR                     2644 aa            linear   PRI 12-APR-2002
DEFINITION  ataxia telangiectasia and Rad3 related protein; Rad3 related
            protein; FRAP-related protein-1; protein kinase ATR [Homo sapiens].
ACCESSION   NP_001175
VERSION     NP_001175.1  GI:4502325
DBSOURCE    REFSEQ: accession NM_001184.2
KEYWORDS    .
SOURCE      Homo sapiens.
  ORGANISM  Homo sapiens
            Eukaryota; Metazoa; Chordata; Craniata; Vertebrata; Euteleostomi;
            Mammalia; Eutheria; Primates; Catarrhini; Hominidae; Homo.
REFERENCE   1  (residues 1 to 2644)
  AUTHORS   Cimprich,K.A., Shin,T.B., Keith,C.T. and Schreiber,S.L.
  TITLE     cDNA cloning and gene mapping of a candidate human cell cycle
            checkpoint protein
  JOURNAL   Proc. Natl. Acad. Sci. U.S.A. 93 (7), 2850-2855 (1996)
  MEDLINE   96181495
   PUBMED   8610130
REFERENCE   2  (residues 1 to 2644)
  AUTHORS   Bentley,N.J., Holtzman,D.A., Flaggs,G., Keegan,K.S., DeMaggio,A.,
            Ford,J.C., Hoekstra,M. and Carr,A.M.
  TITLE     The Schizosaccharomyces pombe rad3 checkpoint gene
  JOURNAL   EMBO J. 15 (23), 6641-6651 (1996)
  MEDLINE   97133293
   PUBMED   8978690

FEATURES             Location/Qualifiers
     source          1..2644
                     /organism="Homo sapiens"
                     /db_xref="taxon:9606"
                     /chromosome="3"
                     /map="3q22-q24"
     Protein         1..2644
                     /product="ataxia telangiectasia and Rad3 related protein"
                     /note="Rad3 related protein; FRAP-related protein-1;
                     protein kinase ATR"
     Region          1640..2185
                     /region_name="FAT domain"
                     /note="FAT"
                     /db_xref="CDD:pfam02259"
     Region          2322..2567
                     /region_name="Phosphatidylinositol 3- and 4-kinase"
                     /note="PI3_PI4_kinase"
                     /db_xref="CDD:pfam00454"

ORIGIN
        1 mgehglelaa mipelrelgs atpeeyntvv qkprqilcqf idriltdvnv vavelvkktd
       61 sqptsvmlld fiqhimkssp lmfvnvsgsh erkgsciefs nwlitrllri aatpschllh
      121 kkicavicsl lflfkskspa ifgvltkall qlfedlvylh rrnvmghave wpvvmsrfls
      181 qldehmgylq saplqlmsmq nlefievtll mvltriiaiv ffrrqelllw qigcvlleyg
      241 spkikslais fltelfqlgg lpaqpastff ssflellkhl vemdtdqlkl yeeplsklik
      301 tlfpfeaeay rniapvylnm lleklcvmfe dgvlmrlkad llkaalchll qyflkfvpaq
      361 yesalqvrkv yvrnickall dvlgievdae yllgplyaal kmesmeiiee iqcqtqqenl
      421 ssnsdgispk rrrlsssInp skrapkqtee ikhvdmnqks ilwsalkqka eslqisleys
      481 glknpviaml egiavvlqlt alctvhcshq nmncrtfkdc qbksikkpsv vitwmsldfy
      541 tkvikscrsl lesvqkldle atidkvvkiy daliymqvns stedhiledl cqmlslpwiy
      601 shsddgclki ttfannlltl scrisdsysp qaqsrcvfll tlfprrifle wrtavynwal
      661 qashevitas cvsgffillq qqnscnrvpk ilidkvkdds divkkefasi lgqlvctlhq
      721 mfyltsslte pfsahghvdl fcrnlkatsq hecsssqlka svckptlfll kkkipspvkl
      781 afidnlhhlc khldfredet dvkavlgtll nlmedpdkdv rvafsqnikh ilesidsedq
      841 fikelfvlrm keaythaqis rnnelkdtli lttgdigran kgdlvpfall hllhcllsks
      901 asvsgaayte lralvaaksv klqsffsqyk kpicqflves lhssqmtalp ntpcqnadvr
      961 kqdvahqrem alntlseian vfdfpdlnrf ltrtlqvllp dlaakaspaa saliirtlakq
```

WEB-BASED WELL PLATE INFORMATION RETRIEVAL AND DISPLAY SYSTEM

FIELD OF THE INVENTION

The field of the present invention is automated laboratory information management systems. Specifically, the invention relates to a computer system and software for retrieving and displaying various types data related to nucleic acid sequencing in a single interface. The invention further provides for retrieval and subsequent display of graphical, alpha-numeric and numeric information from a plurality of data sources via an interactive display. The invention also provides for the automatic assembling of the various types of data and other data based upon analysis of biological samples stored in 96 well-plates.

DESCRIPTION OF THE RELATED ART

Biological samples, specifically nucleic acid sequences and/or proteins, are analyzed in a variety of ways, but typically are loaded into 96-well plates for analysis in, for instance, a sequencer. There are many plate formats, such as the 384 well-plate and the 96 well-plate. For instance, the 384 well-plate is formed with 384 separate wells, each able to receive a separate biological sample for processing and analysis. The 96 well-plate is formed with 96 separate wells.

Samples in well-plates are typically processed by being separated from undesirable materials, for instance, by centrifugation and/or treatment with predetermined reagents or enriched by enzymatic amplification. The samples may be treated in the wells of a well-plate or may be processed prior to being deposited in the well-plate. Regardless, well-plates have become a standard in the industry for processing and analysis of biological samples.

If the samples are either proteins or nucleic acid sequences, they may be cloned or replicated in any of a variety of techniques. In the cloning process, a variety of complex reactions are required and upon completion of cloning, it is often necessary to confirm the cloning process. If the samples are altered gene sequences that have undergone manipulation, then it is desirable to analyze the produced clone to verify results. Typically, nucleic acid materials and/or protein materials are identified via analysis in a sequencer. Most sequencers, such as the ABI 377, manufactured by Applied Biosystems, Foster City, Calif., or MegaBACE manufactured by APBiotech, a division of Amersham Biosciences, Piscataway, N.J., output a chromatogram that consists of a plurality of combined curves or graphs, where each peak in the graph or curve represents the presence of a specific species of dye-labeled nucleotide or primer. The plurality of curves typically consists of four channels, each representing a chromatic signal corresponding to the n-terminal nucleotide or its primer. The chromatogram is typically analyzed by a computer to determine a sequence listing corresponding to the biological sample examined in the sequencer. Over the years, a standard format known as a FASTA has been adopted by the scientific community for the textual representation of a sequence listing, and is well know in the industry.

Once a sequence listing has been compiled by analysis of a chromatogram, it is further possible to obtain public information concerning the sequence listing by searching public databases. There are two well known tools for searching public databases by inputting the sequence listing in the FASTA format. One such database is commonly known as BLAST and the other is BLAT.

BLAST (Basic Local Alignment Search Tool) is one of many search tools available from the National Center for Biotechnology Information (NCBI). BLAST is a set of similarity search programs designed to explore all of the available sequences databases regardless of whether the query is protein or DNA, in order to search for relationships among presented sequences which share isolated regions of similarity with sequences in public databases.

BLAT (BLAST Like Alignment Tool) is a database search tool that performs sequence alignment and displays the alignment results in the Genome Browser developed by Jim Kent and provided by UCSC (University of California, Santa Cruz) showing the queried portions of the genome at any scale aligned in register with dozens of annotation tracks (known genes, predicted genes, ESTs, mRNAs, DpG islands, assembly gaps and coverange, chromosomal bands, mouse homologies, and more).

Phreds (Phred score): Phreds or Phred scores are measures of the quality of a base call for a multi-fluorescence nucleic acid electrophoresis gel. Phred uses simple Fourier methods to examine the four base traces in the region surrounding each point in the data set in order to predict a series of evenly spaced predicted locations. That is, it determines where the peaks would be centered if there were no compressions, dropouts, or other factors shifting the peaks from their "true" locations. Next phred examines each trace to find the centers of the actual, or observed, peaks and the areas of these peaks relative to their neighbors. The peaks are detected independently along each of the four traces so many peaks overlap. A dynamic programming algorithm is used to match the observed peaks detected in the second step with the predicted peak locations found in the first step. Phred evaluates the trace surrounding each called base using four or five quality value parameters to quantify the trace quality. It uses a quality value lookup table to assign the corresponding quality value. The quality value is related to the base call error probability by the formula $QV=-10*\log\_10(P\_e)$ where $P\_e$ is the probability that the base call is an error.

Laboratory information management systems (LIMS) are typically computer systems that process raw instrument data, track sample inventory and generate results of a scientific laboratory. LIMS have been created with stand alone files as well as relational databases. Further these systems enhance a scientist's ability to perform laboratory research and allow a modern laboratory to process samples with high-throughput, consistency, reproduce-ability and accountability.

A DNA Sequencer is typically used for analyzing biological samples to determine the nucleic acid sequence of each sample. DNA Sequencers typically provide an output in the form of a series of overlapping graphs referred to as raw chromatograms. The raw chromatograms must be analyzed to determine the actual sequence, the reliability of the data in the chromatogram, and determine the sequence represented by the graphs. Typically, the chromatograms are analyzed in a separate data analyzer, or a data analyzer associated with the sequencer. The data analyzer (Phred) produces a string of letters representing called nucleotide bases, and a corresponding confidence score for each called base. The confidence score generated by Phred provides a numeric determination of the reliability of the called nucleotide base. The last step before being reviewed by the scientist or researcher is called trimming where any vector or "junk" sequences are removed. A sequence that has been processed to this point is referred to as "trimmed".

A scientist studying a plurality of trimmed sequences from a sequencer and data analyzer has a difficult job manually reviewing and evaluating the data and determining the value and reliability of such data in a timely manner. Hence, there is a need for a simple and direct means for reviewing and studying such quantities data, preferably in conjunction with a LIMS.

SUMMARY OF THE INVENTION

One object of the present invention is a method for retrieving and presenting scientific data associated with biological samples deposited in a well plate. The method may provide for a depiction of a well plate on a computer screen, wherein the data associated with each biological sample is indicated in a well location of the well plate on the computer screen corresponding to the actual location in a real well plate. The data represented in each well includes the presence of a chromatogram, the presence of a usable called sequence, an identified BLAST ID, a BLAT expectation value, a LIMS identifier, and an indication of the Phred score for the sample in the well location. At least one portion of the data represented in each well location may also provide a link to further data, such as a sequence listing and a chromatogram. Further the well data may contain indications of the absence of a BLAST hit, sequence quality, percentage of good bases in sequence, and length of the sequence.

A further object of the present invention may be a method of creating an interactive GUI to display information relating to samples stored in well-plates. The method may provide for the creation of a list of well plates that have been sequenced. The method may also place the sequenced well plates into a queue. The method may further provide for a computer to automatically check when well plates are waiting in the queue. Upon the method determining the existence of a well plate in the queue, the method may perform sequence homology searches on the well-plate and the specimens contained within it. Finally the method may create a GUI to display said well plate's sequence and sequence homology data.

BRIEF DESCRIPTION OF THE DRAWINGS

FIG. 3 is a representation of a web-browser displayed on a computer screen, showing a menu of sequencing related links displayed by a LIMS, in accordance with the present invention;

FIG. 4A is a representation of a portion of web-browser displayed on a computer screen, showing a status list of identifiers, each identifier representing a well-plate where data corresponding to each well-plate is being or has been processed, the depiction in FIG. 4A being displayed in response to selection of the STATUS link depicted in FIG. 3, in accordance with the present invention;

FIG. 4B is a representation of a portion of web-browser displayed on a computer screen, showing a window for inputting an identifier that represents a well-plate, the depiction in FIG. 4B being displayed in response to selection of the SEQUENCING PLATE CHECK link shown in FIG. 3, in accordance with the present invention;

FIG. 8A is a representation of a computer screen display, showing SEQ ID NO: 1, that is generated in response to selection by computer digitizer interaction, of one portion of the data depicted in the well locations of the well plate depicted in FIG. 7, in accordance with the present invention;

FIG. 8B is a representation of a computer screen display, showing SEQ ID NO: 1, that is generated in response to selection by computer digitizer interaction, of one portion of the data depicted in the well locations of the well plate depicted in FIG. 7, in accordance with the present invention;

FIG. 9 is a representation of a portion of the computer screen display depicted in FIG. 8A, on a slightly enlarged scale to more clearly show the depiction of data, in accordance with the present invention. SEQ ID NO: 2 is depicted in this figure;

FIG. 12 is a screen display showing SEQ ID NO: 3 at the top and SEQ ID NO: 4 at the bottom, which are data based upon the BLAT search of the UCSC Genome Browser (BLAT Browser) that is accessed by selection of any of the details links in the ACTIONS column depicted in FIG. 10, in accordance with the present invention;

FIG. 13 is a representation of a computer screen display that includes a chromatogram and sequence listing, showing SEQ ID NO: 2, generated in response to the selection of the Chromatogram button shown at the top of FIGS. 8A and 9, where the selection is made by computer digitizer interaction, in accordance with the present invention;

FIG. 15 is a representation of a computer display screen generated in response to the selection of the Align Seqids button shown at the top of FIGS. 8A and 9, where the selection is made by computer digitizer interaction, in accordance with the present invention. This figure also shows SEQ ID NO: 5;

FIG. 16 shows a portion of the computer screen display depicted in FIG. 15, on an enlarged scale, to show the depicted data, SEQ ID NO: 5, more clearly, in accordance with the present invention;

FIG. 17 is a representation of a computer screen display generated in response to the selection of one of the BLAST hits listed in the lower portion of FIG. 5, in accordance with the present invention;

DETAILED DESCRIPTION OF THE DRAWINGS

The present invention may be embodied as a software application resident with, in, or on any of the following: a relational database, a Web-server, a separate programmable device that communicates with a Web-sever through a communication means, a software device, a tangible computer-usable medium, or otherwise. Embodiments comprising software applications resident on a programmable device are preferred. Alternatively, the present invention can be embodied as hardware with specific circuits, although these circuits are not now preferred because of their cost, lack of flexibility, and expense of modification.

The present invention may be a computer program used in conjunction with a laboratory inventory management system or relational database. The present invention may provide for a graphical user interface (GUI) which enables a user to retrieve data corresponding to biological samples contained in predetermined wells a multi-well well-plate. Further, the GUI may provide the user important information in a useful manner for each a plurality of samples, each sample stored in a separate well of the well plate.

The present invention may contain at least five separate mechanisms to provide the user with information for the various wells in the well plate. The first mechanism may be retrieval of data relating to the sequence of biological material contained in the well-plate. The second mechanism may be links to sequences identified by BLAST and/or other searchable genomic databases that are homologous to the sequence contained within a corresponding well in the well-plate. The third mechanism for interactively presenting information to the user may be a score indicating the goodness of a sequence. The fourth mechanism for interactively presenting information to the user through a GUI may be an indicator of the number of good (high-quality) bases located within the sequence. The last mechanism for providing information may be an indication of the length of the sequence contained in the individual well.

Figure 1:
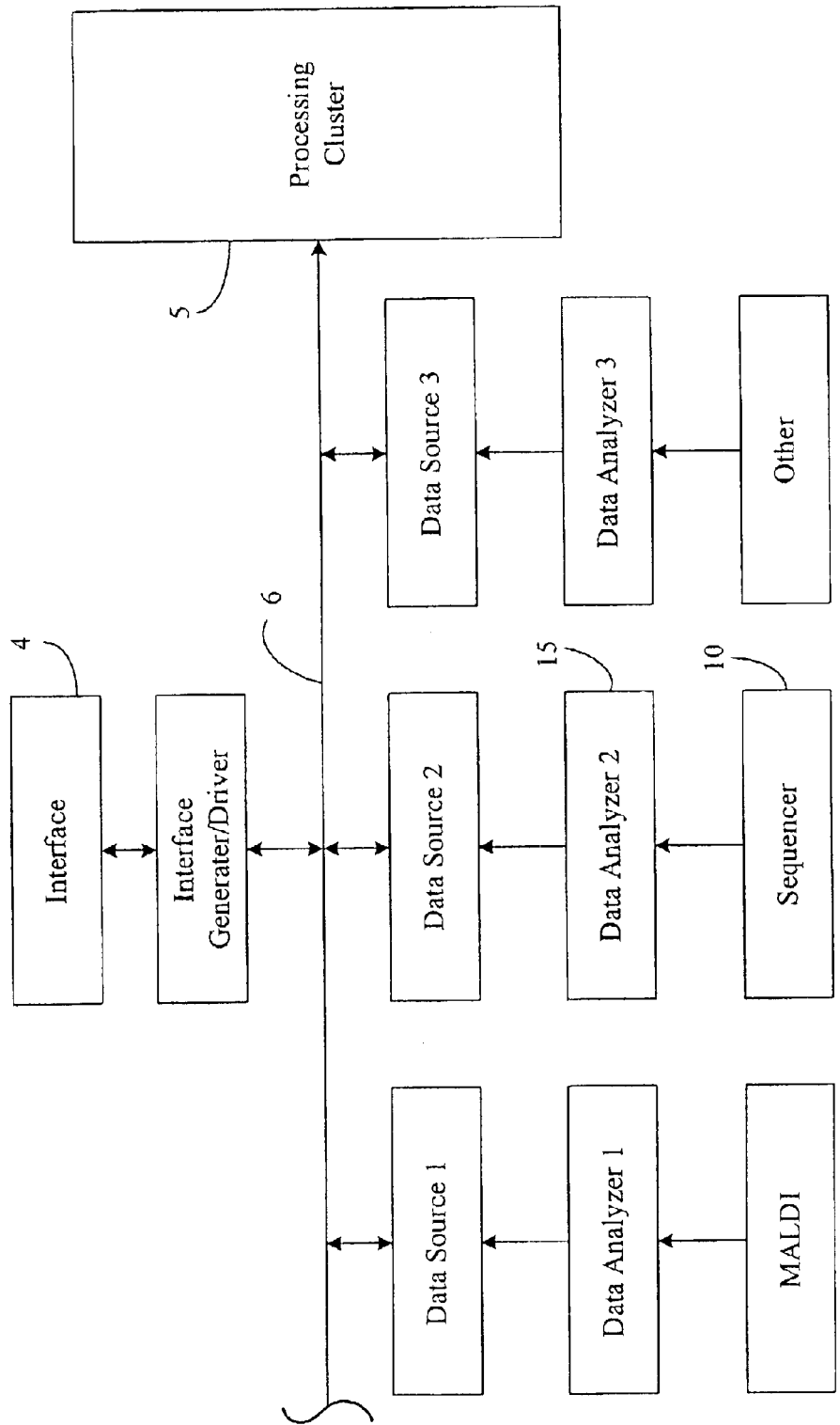
FIG. 1 is a schematic block diagram representing a basic computer system configuration that defines a portion of a Laboratory Information Management System (LIMS) that includes multiple data sources and at least one user interface for accessing data from the multiple data sources in accordance with the present invention.

FIG. 1 is a block diagram depicting a portion of a laboratory information management system (LIMS) that includes a processing cluster 5 (described in greater detail below), a mass spectrometer, a Sequencer, and other data generating equipment. The mass spectrometer is connected to a data analyzer, and the DNA Sequencer is like-wise connected to a data analyzer. The data analyzers may be linked to one another, they may be the same computer, they may be part of the processing cluster 5 (also depicted in FIG. 18), or they may be configured as shown in FIG. 1. The depiction in FIG. 1 is only one example of the organization of the data manipulating processors of the LIMS, but the present invention is not limited to the specific configuration depicted.

In one embodiment of the present invention, the LIMS includes a plurality of connected computers and processors that communicate with one another via a network that may be an intranet 6 or local area network. The LIMS also include the above mentioned processing cluster 5 depicted in FIG. 18. The processing cluster 5 includes a database 20 having multiple datasets stored therein, such as chromatograms, FASTA sequences, BLAST IDs from using the BLAST search engine, BLAT search information and other related biologically derived data such as Phred quality scores and Phrap search information.

The LIMS and associated cluster 5 includes programming enabling both processing and search capabilities for conducting BLAST, BLAT, Phred and Phrap searching and alignments in a manner well known in the art. However, in accordance with the present invention, the processing cluster distributes searching and alignment procedures among the clustered processors in the processing cluster 5 in order to more rapidly conduct such operations.

Figure 5:
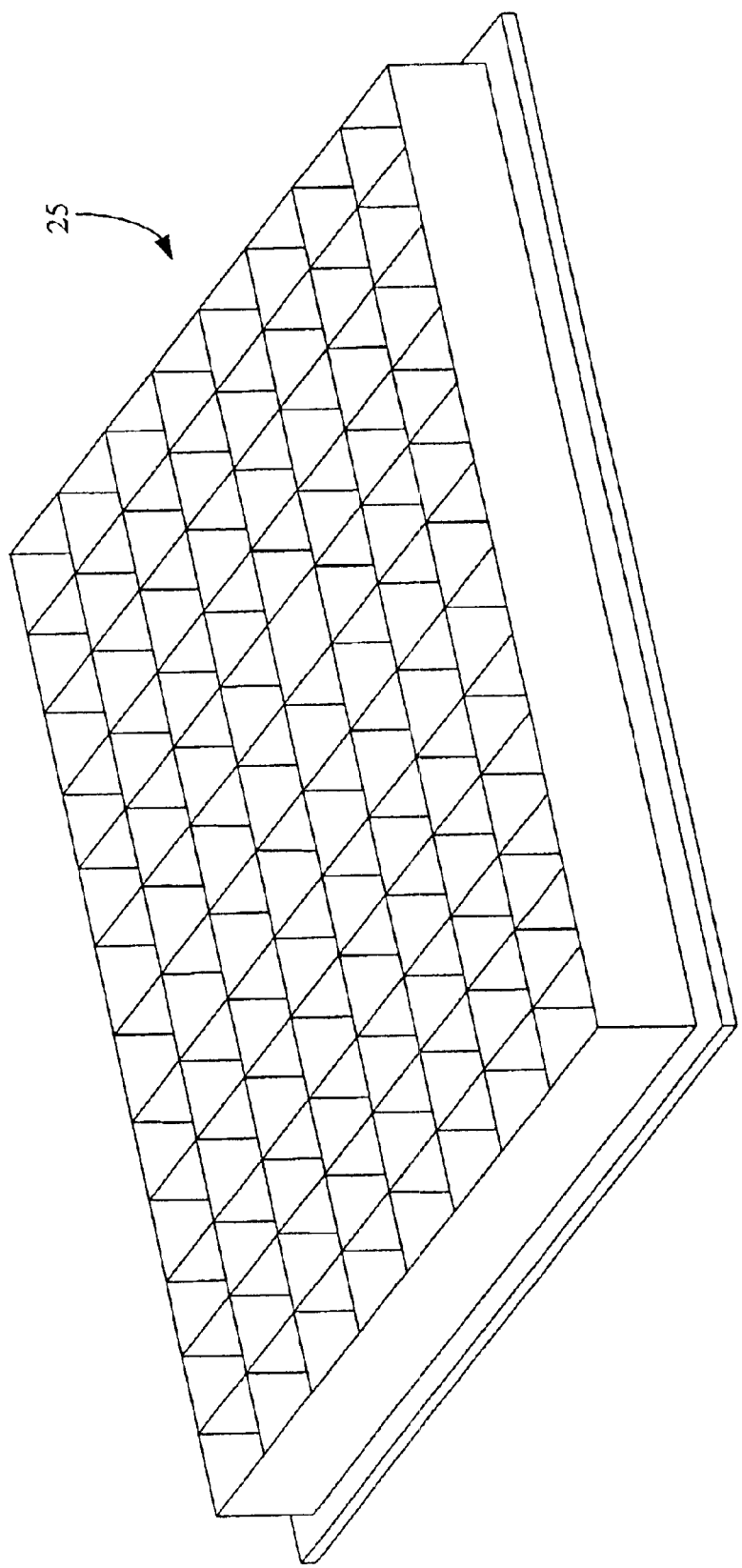
FIG. 5 is a perspective view showing an example of a well-plate with biological samples stored in each well of the well-plate, in accordance with the present invention.

Biological samples stored in well plates, such as the 96-well plates depicted in FIG. 5, are subjected to analysis in the DNA Sequencer 10 (FIG. 1) in order to produce a chromatogram, which is in turn analyzed by a data analyzer 15 to determine a trimmed sequence listing for each biological sample. The chromatogram and listing are stored in the LIMS in, for instance, the relational database 20 (see FIG. 18) of the LIMS.

The generated sequence listing may then be searched in both private and public databases to provide further information regarding the biological samples. For instance, the sequence listing can be entered into the BLAST search engine, the BLAT search engine, and/or other search engines. Phred turns the chromatogram into called bases. Phrap compares the "raw" sequence with a list of known in-house host vectors and marks the vector portion of the "raw" sequence. Next, the marked vector sequence is removed from the sequence along with any other artificial sequences to produce a "trimmed" sequence.

Figure 2:
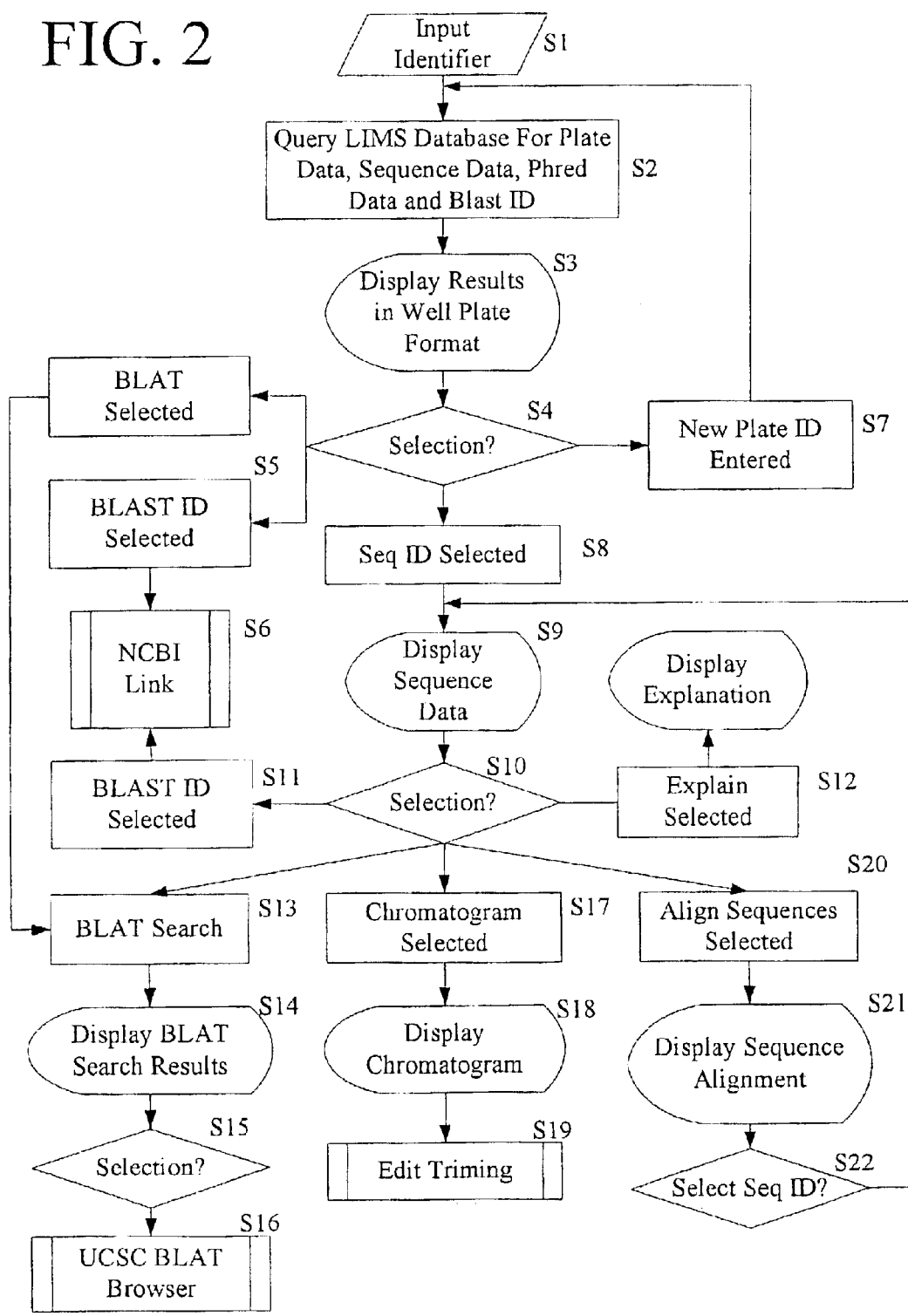
FIG. 2 is a flowchart showing one example of operation of a user interface for accessing and displaying the data from the multiple data sources, in accordance with the present invention.

A large amount of data may be collected based upon the analysis of a single biological sample. Specifically, the chromatogram, sequence listing, BLAST hits, BLAT information and Phred score related data is assembled for a scientist's consideration. An interface has been constructed to provide a means for displaying the collected data in a single interface. The flow of the data in the interface of the LIMS is depicted in FIG. 2 and is described in greater detail below along with examples of displays generated on a computer screen, and shown in FIGS. 3, 4A, 4B, 6–17 and 19.

FIGS. 3, 4A, 4B, 6–17 and 19 are exemplary views of an interactive GUI that displays the assembled data corresponding to each of a plurality of biological samples stored in a single well-plate or multiple well-plates. The GUI may be accessed within a Web-Browser based system or though any other means such as interactive graphics.

Initially, the LIMS provides a menu page displayed on a computer screen display, for instance as is shown in FIG. 3 with a web-browser interface. It should be understood that while FIG. 3 shows a web-browser interface for displaying a menu, it is possible to employ any of a variety of graphical interfaces for displaying the various assemblages of data described hereinbelow.

In FIG. 3, a menu of links is shown, where clicking of a mouse or other computer selection device or digitizer, directs the computer or LIMS to another display. By selecting the Status link, the depiction in FIG. 4A is displayed. By selecting the Sequencing Plate Check link, the depiction in FIG. 4B is displayed. The remaining links depicted in FIG. 3 link to various additional displays, some shown in the drawings and described hereinbelow.

FIG. 4A shows a list of identifiers, where each identifier represents a marked well-plate, such as the 96 well-plate 25 depicted in FIG. 5 or other similar plate such as a 384 well-plate. Each identified well plate 25 has a plurality of wells, each well may retain a biological sample that has been analyzed to determine, for instance, a sequence listing that was determined based upon a sequencer chromatogram. The chromatogram and sequence listing are both further analyzed by comparison to publicly available sequence listings, thereby providing a wealth of information that must be considered for each biological sample located in the wells of the well-plate.

Each of the identifiers depicted in FIG. 4A is in the form of a six-digit number. Two columns of such identifiers are depicted in FIG. 4A, one on the right side and one on the left side. The left hand column identifiers under the heading CHROMATOGRAMS represent well-plates having chromatograms associated with biological samples, where the chromatograms are currently being, or are waiting in a queue to be analyzed to determine a sequence listing associated with the corresponding biological sample. The right hand column identifiers under the heading BLAST represent well-plates having determined sequence listings that are being subjected to a BLAST search to identify corresponding sequences from private and public sequence listing databases.

It should be understood that the identifier may be in any form with numbers and/or alpha-numeric characters. In the depicted example, the six-digit characters are divided into two groups for housekeeping purposes only. Specifically, identifiers beginning with the digit 4 correspond to 3' nucleic acid sequences and the identifiers beginning with the digit 5 correspond to 5' nucleic acid sequences. Therefore, for each 3' sequence there is likely at least one corresponding 5' sequence. For housekeeping purposes, a 3' sequence and its corresponding 5' sequence (if they came from the same biological sample) have their last five digits in common. For instance, the identifiers 400011 and 500011 came from the same sample, but the 400011 plate has the 3' end of the sequence and the 500011 has the 5' end of the sequence.

Figure 6:
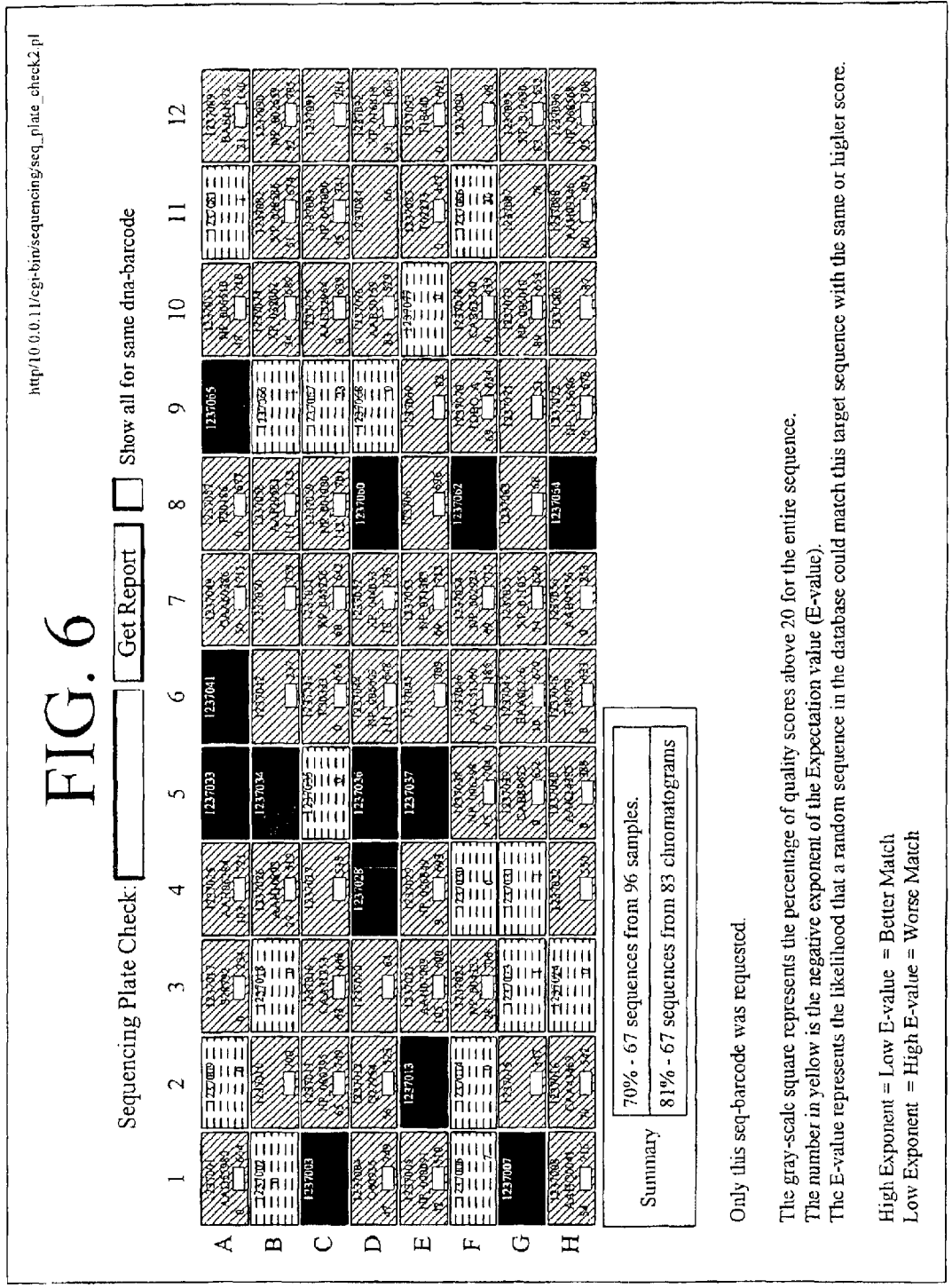
FIG. 6 is a representation of a computer screen display depicting processed data in the form of alpha-numeric characters, the data being displayed in alignment with well locations of a 96 well-plate, where the data in each well location corresponds to actual biological samples stored in corresponding wells in a 96 well-plate, and further within each depicted well location, pre-selected colors or shades of grey represent further aspects of the data, in accordance with the present invention.

In FIG. 4A, each of the identifiers is further a link to, for instance, the depiction in FIG. 6 where a 96 well-plate is shown with a plurality of different types of data depicted in each well corresponding to the biological sample stored in a corresponding well location in the identified well-plate. Specifically, by selecting one of the six digit identifiers in FIG. 4A, a user can link to a depiction of the identified well plate with data represented in each well location of the well-plate, as is described in greater detail below.

In FIG. 4B, an input window is shown wherein a user may enter in a specific well plate identifier in order to look at a specific well plate, thereby linking directly to an inputted well plate depiction, such as the depiction shown in FIG. 6.

In FIG. 6, the well-plate identifier 400011 has been displayed either in response to selection of that identifier in one of the lists shown in FIG. 4A or that identifier was inputted into the window depicted in FIG. 4B. The selected or inputted identifier is displayed at the top of the well-plate along with a second identifier, in the depicted example, the second identifier is D1100003353 which corresponds to another well plate or other storage container that contains a raw biological sample.

Figure 19:
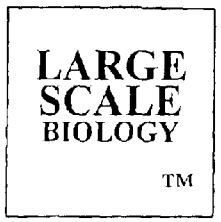
FIG. 19 shows a depiction of a portion of a computer display screen similar to FIG. 3, with two 96 well-plates depicted side by side, with data depicted in each well of both plates in a manner similar to the data represented in the well-plate in FIG. 3, in accordance with the present invention.

At the top of the screen display depicted in FIG. 6, there is a window for inputting another identifier. The identifier is may be another six-digit well-plate identifier or may be another sample holding identifier, such as D1100003353 corresponding to a well-plate that contains raw biological data. By inputting such an identifier, two or more 96-well plates may be generated for display on the computer screen, as shown in FIG. 19, and described in greater detail below.

Figure 7:
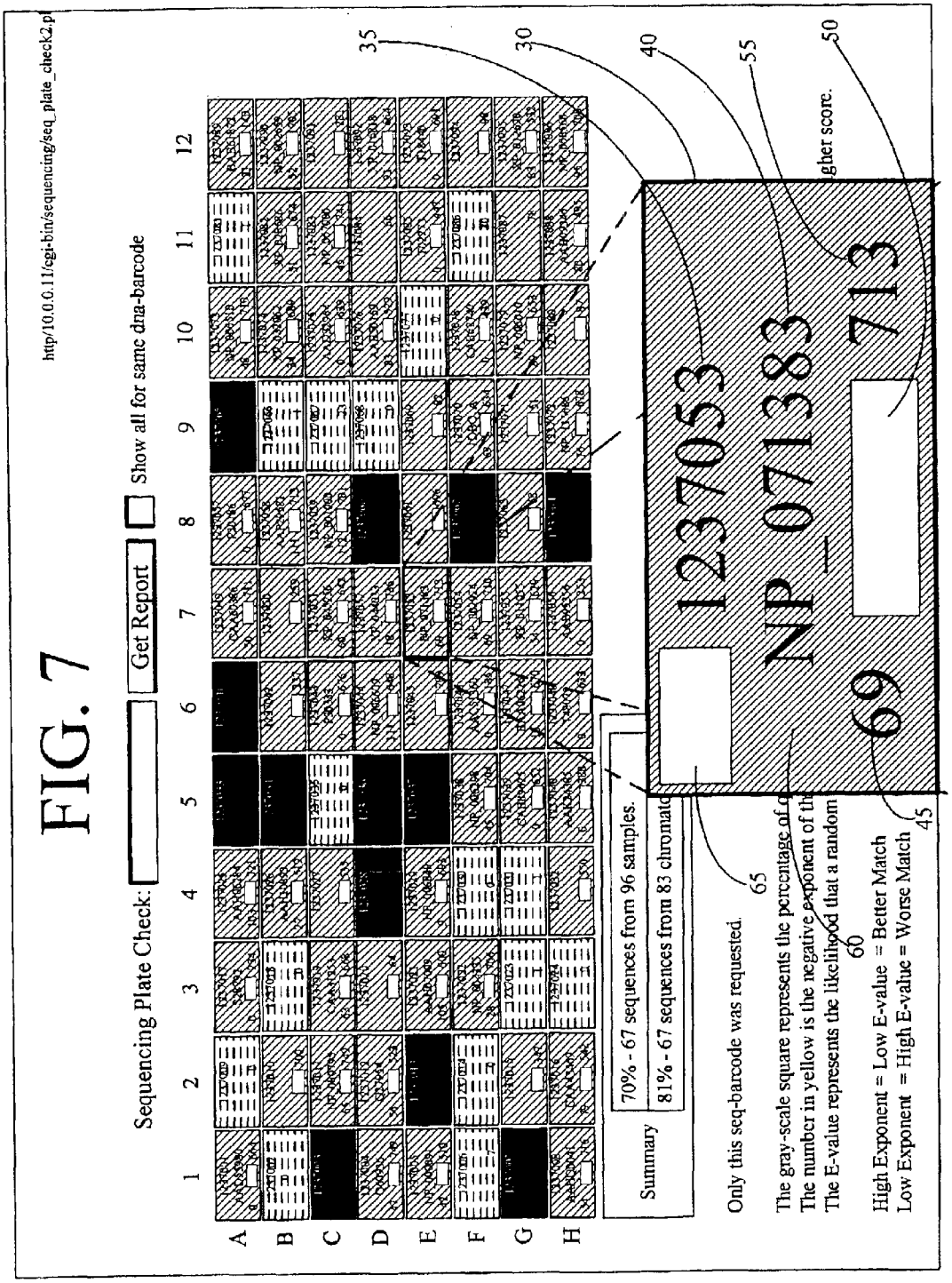
FIG. 7 is a representation of a computer screen display, similar to FIG. 6, where one well display is enlarged to more clearly show the various types of data displayed, in accordance with the present invention.

In order to fully appreciate the depth of information displayed in the well-plate configuration depicted in FIG. 6, attention focuses now on FIG. 7, which is similar to FIG. 6, but has one well 30 enlarged in order to more clearly recognize all of the data included displayed in each well of the depicted well-plate.

As shown in FIG. 7, each well 30 includes an indication of several different types of data. The first datum 35 displayed at the top of the well 30 is a seq_ID, which is a LIMS identifier randomly assigned to each sample irrespective of its source. Each seq_ID in each well represents the original sample source. The second datum 40 displayed under the first datum 35. If a second datum 40 is present, it indicates that a BLAST ID has been determined indicating that the biological sample appears to be identical or almost identical to a known or previously identified sequence, know either within the local lab or is publicly known. Below and to the left of the second datum 40 is a third datum 45 that represents a statistical evaluation of the BLAST ID. Specifically, the third datum 45 is a negative value representing the logarithmic expectation of the reliability of the BLAST ID.

At the bottom center of the well, to the right of the third datum 45 is a box 50 that represents the fourth datum. The box 50 represents a composite Phred score. Specifically, an individual Phred score is derived for each called base in a sequence, as was described above. The individual Phred quality scores for all the called bases in a sequence are tallied in order to produce a composite Phred score, where the composite Phred score is given in predetermined colors or shades of gray (grayscale) representing the percentage of individual Phred quality scores equal to or greater than 20. In FIG. 7, the blown up box 50 shows the composite Phred quality score, where the lighter the color or grayscale, the better the score. Typically an individual Phred score of 20 or greater is an indication that the particular base call in the sequence listing is reliable. The box 50 is shaded in the display shown in FIGS. 6 and 7 where a lighter shade indicates a high composite Phred quality score (a good Phred quality score) and a darker shade indicates a low composite Phred quality score. Therefore, if the box 50 has a lighter shading, the sequence listing (shown in FIGS. 8A, 8B and 9) is likely to be very reliable. If the box 50 has a dark shading, then the sequence listing will be suspect. The color/grayscale scheme in depicted in box 50 provides a quick and simple means for a researcher to make a rapid determination regarding the data presented.

It should be understood that the shading of box 50 can be grayscale shading or shading based upon predetermined colors. For instance, the color white may be used as an indication of a reliable composite Phred quality score, a medium shade of gray or brown may mean a score that indicates the data may need some re-evaluation, and dark blue or black may indicate that the sequence listing is totally unreliable. Additional colors or grayscale shading may be used to provide several levels of composite Phred quality scores.

To the right of the box 50, is another datum 55 that is a number indicating the length of the trimmed sequence listing. The shading of the background 60 of the well 30 is yet another datum. Specifically, the shading of the background 60 signifies the following:

a first color or shading indicates that the sample is a control;

a second color or shading indicates that the sequence listing has been verified by computer as good;

a third color or shading indicates that the sequence listing could not be determined because the chromatogram had problems or was unintelligible;

a fourth color or shading indicates that no data is available; and a fifth color indicates that the sequence listing was manually validated by a technician or scientist.

Several of the data items depicted in each well 30 link to further data. For instance, by clicking (using a digitizer) or otherwise selecting the first datum 35, which is the seq_ID, the user interface generates the depiction shown in FIGS. 8A, 8B and 9, as is described in greater detail below. By selecting the second datum 40 (the BLAST ID), the user interface generates the depiction shown in FIG. 17, as is described in greater detail below. Additionally, as an alternative embodiment, it is also possible to select a box 65 in the upper left hand corner of each well 30 to link to the BLAT search engine.

As mentioned above, by selecting the first datum 35 in FIG. 7, the seq_ID, it is possible to link to the depiction in FIGS. 8A and 8B. The upper portion of the screen display depicted in FIG. 8A is shown in an enlarged form in FIG. 9 to provide greater clarity. Returning to FIG. 8A, in the upper line two identifiers are provided, first the seq_ID and second, the well plate identifier (1302649 and 400464, respectively). The data below the identifiers includes the following: at top, a first shaded sequence listing 70 (described below with respect to FIG. 9); next a second shaded sequence listing 75, described below; a third representation of the sequence listing 80 in FASTA format so that a user may copy the listing as a text file and use elsewhere; a list 85 of all BLAST ID hits; and a window 90 into the BLAT search, described further below with respect to FIGS. 10, 11 and 12.

The first shaded sequence listing 70 depicted near the top of FIG. 8A is shown on a larger scale to show greater detail in FIG. 9. As is more clearly shown in FIG. 9, each letter of the sequence listing is provided with individual background shading. The background shading corresponds to the individual Phred score calculated for each individual base. As was described above, box 50 in FIG. 7 displays a color or grayscale indication of the composite Phred quality score. The composite Phred quality score is based upon an analysis of all of the individual Phred quality scores which are displayed in the first shaded sequence listing 70 in FIG. 8A. Specifically, in the listing 70, each base (depicted with one of the four letters A, C, G or T) is displayed with a background color or grayscale shading where the color or grayscale shading of each base indicates the individual Phred score where a light color indicates a favorable individual Phred score and the darker the color indicates a lower individual Phred score.

Returning to FIG. 8A, the second shaded sequence listing 75 just below the first shaded sequence listing 70, again presents the Phred score indications, but divides the score into two categories: Phred scores greater that 20 are indicated in a light color and Phred scores less than 20 are indicated by a dark color. Therefore, in the second shaded sequence listing 75 there are only two shades of color or grayscale used in the depiction of the listing.

The two shaded sequence listings 70 and 75 provide a technician or scientist with a quick summation of the Phred scores, thus enabling a more rapid determination of the validity of the computer's conclusions regarding the data. The interface of the present invention provides the user with a quick glance interface making review of the data a more efficient process.

If the sequence listing is acceptable to the user, the FASTA format depiction 80 in FIGS. 8A and 8B provides a way to quickly copy the sequence listing and paste it elsewhere, for instance, in another file in another computer application, such as a text editor or word processor.

Below the FASTA format depiction 80, a list 85 of all BLAST ID hits is provided. By selecting one of the BLAST IDs, a user can link to more detailed information regarding that hit as the interface generates an image such as that depicted in FIG. 17, which may be an image generated by the LIMS of the present invention, or may alternatively be a direct link to the National Center For Biotechnology Information (NCBI) which provide the BLAST search engine and database to the biotechnology community. The display shown in FIG. 17 includes information regarding the BLAST hit and is well documented by the NCBI, and therefore is not described in greater detail herein.

Below the BLAST ID list 85 is a window 90 that links to the BLAT search engine, described further below with respect to FIGS. 10, 11 and 12.

Figure 10:
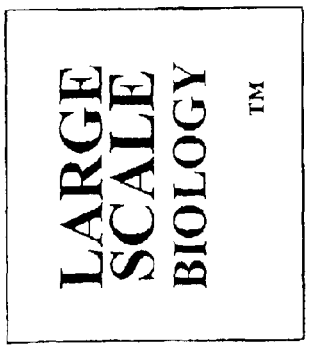
FIG. 10 is a representation of a list of data results generated in response to the selection of the BLAT search button shown in the computer screen display depicted at the bottom of FIG. 8B, where the selection is made by computer digitizer interaction, in accordance with the present invention.
Figure 18:
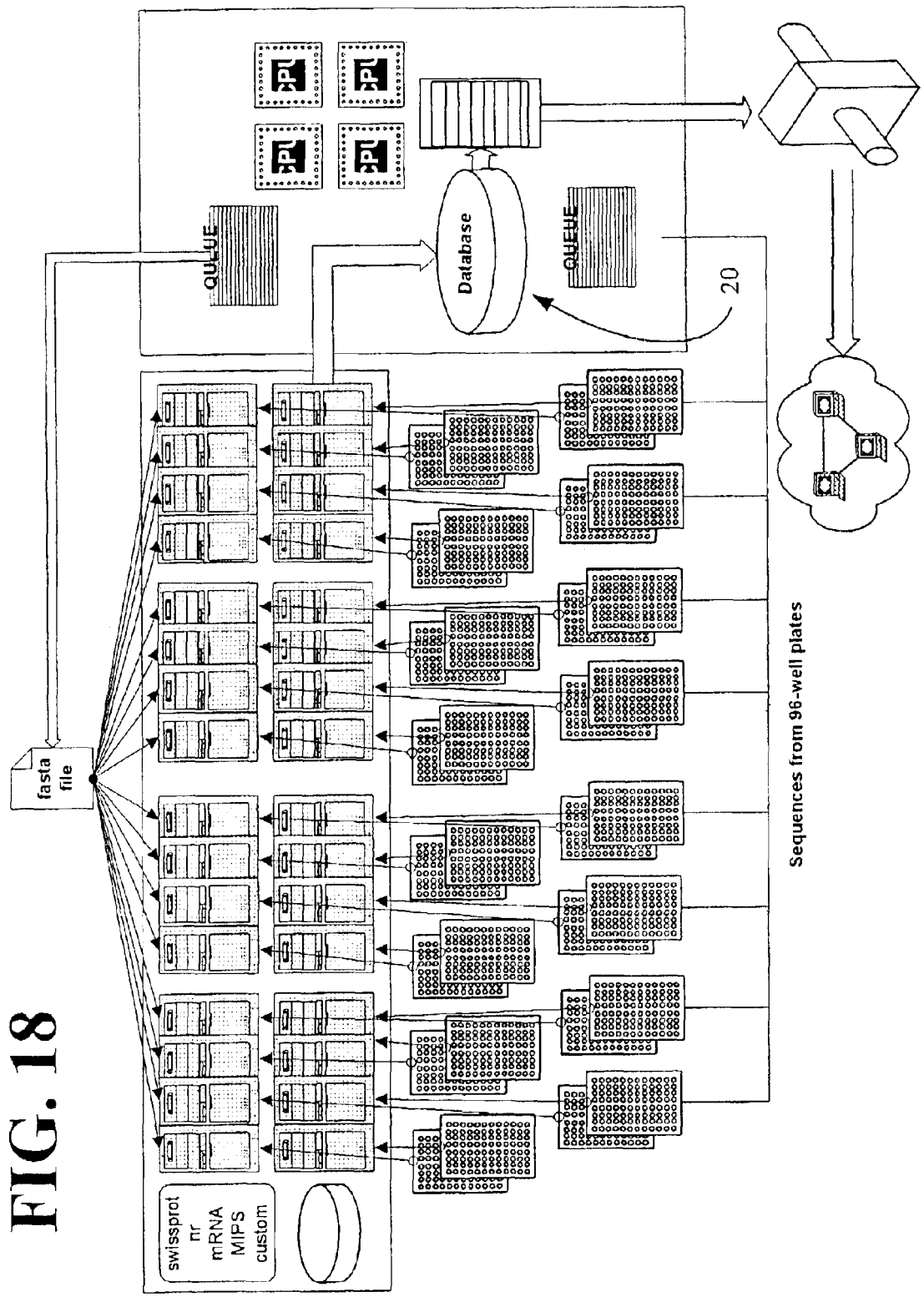
FIG. 18 is a block diagram showing a representation of details of a clustered computer system depicted in FIG. 1, the clustered computer system forming a portion of the LIMS, in accordance with the present invention.

As shown in FIG. 10, a search using BLAT yields a list of identified genes where each of the genes listed have some homology with the sequence searched. By selecting (clicking a mouse or digitizer) on the browser link corresponding the any one of the listed genes, the user directs the interface to link to the University of California Santa Cruz (UCSC) Genome Browser. It is possible to link to the UCSC Genome Browser, or alternatively, the Genome Browser can be downloaded and run locally on the processing cluster 5 (FIG. 18). The Genome Browser includes the BLAT alignment tools for aligning selected sequences against stored gene sequences.

Figure 11:
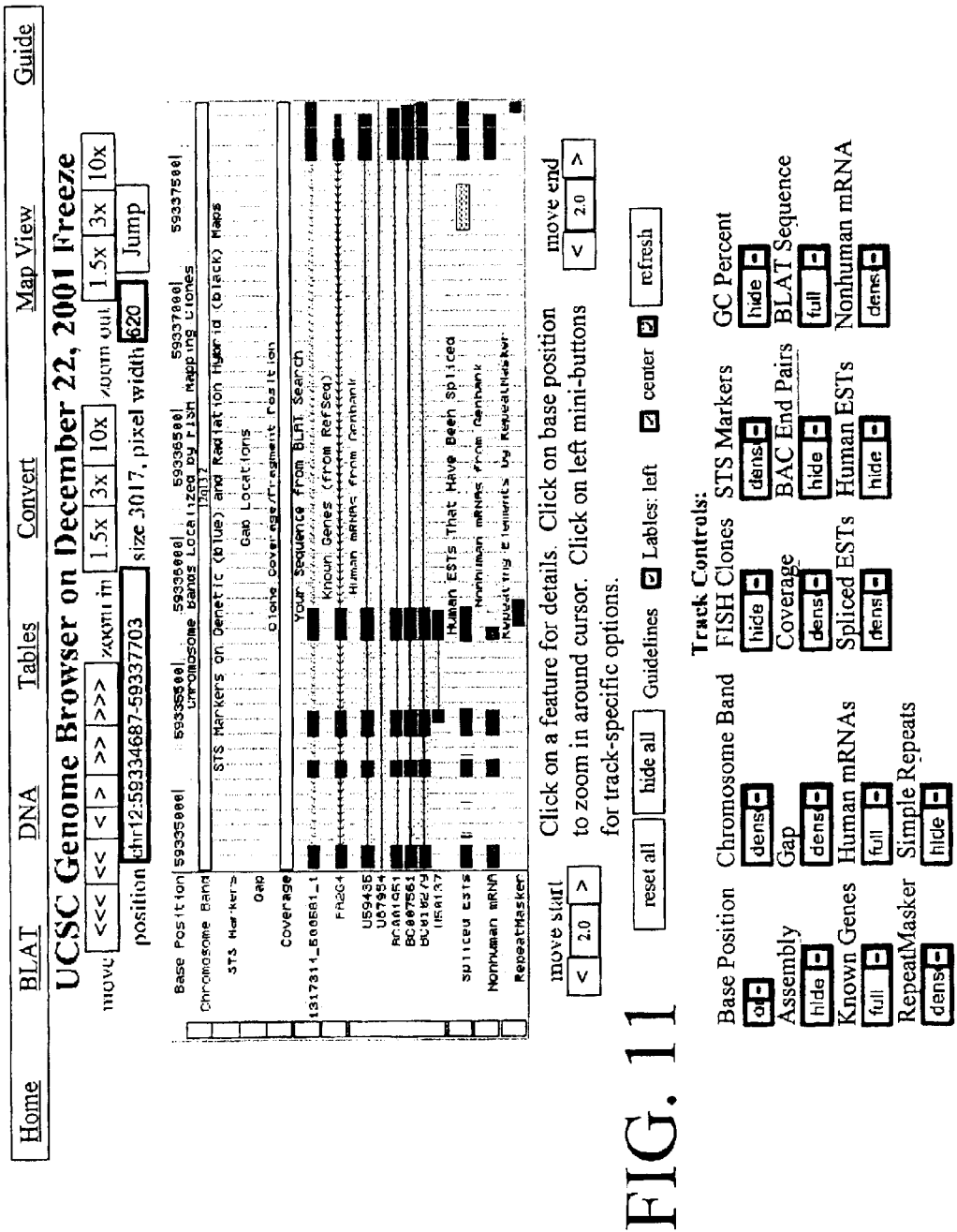
FIG. 11 is a screen display of the UCSC Genome Browser (BLAT Browser) that is accessed by selection of any of the browser links in the ACTIONS column depicted in FIG. 10, in accordance with the present invention.

The Genome Browser, as shown in FIG. 11, displays portions of an identified gene or genes, and adds to the gene display small blocks that overly portions of the gene that correspond to the sequence searched. In other words, the sequence is compared with the known gene sequences and areas of commonality or homology are identified and displayed, as in FIG. 11. The small blocks in the display represent the portions of the searched sequence that have homology with the blocked portions of the identified genes. The display in the upper portions of FIG. 11 is graphical, and links to the display in FIG. 12 where the actual text listing of the sequence are provided along with those portions of the gene where the homology has been identified.

At the top of FIGS. 8A and 9 there three linking buttons that may be selected by a user, a first button 92, a second button 94 and a third button 96.

Figure 13:
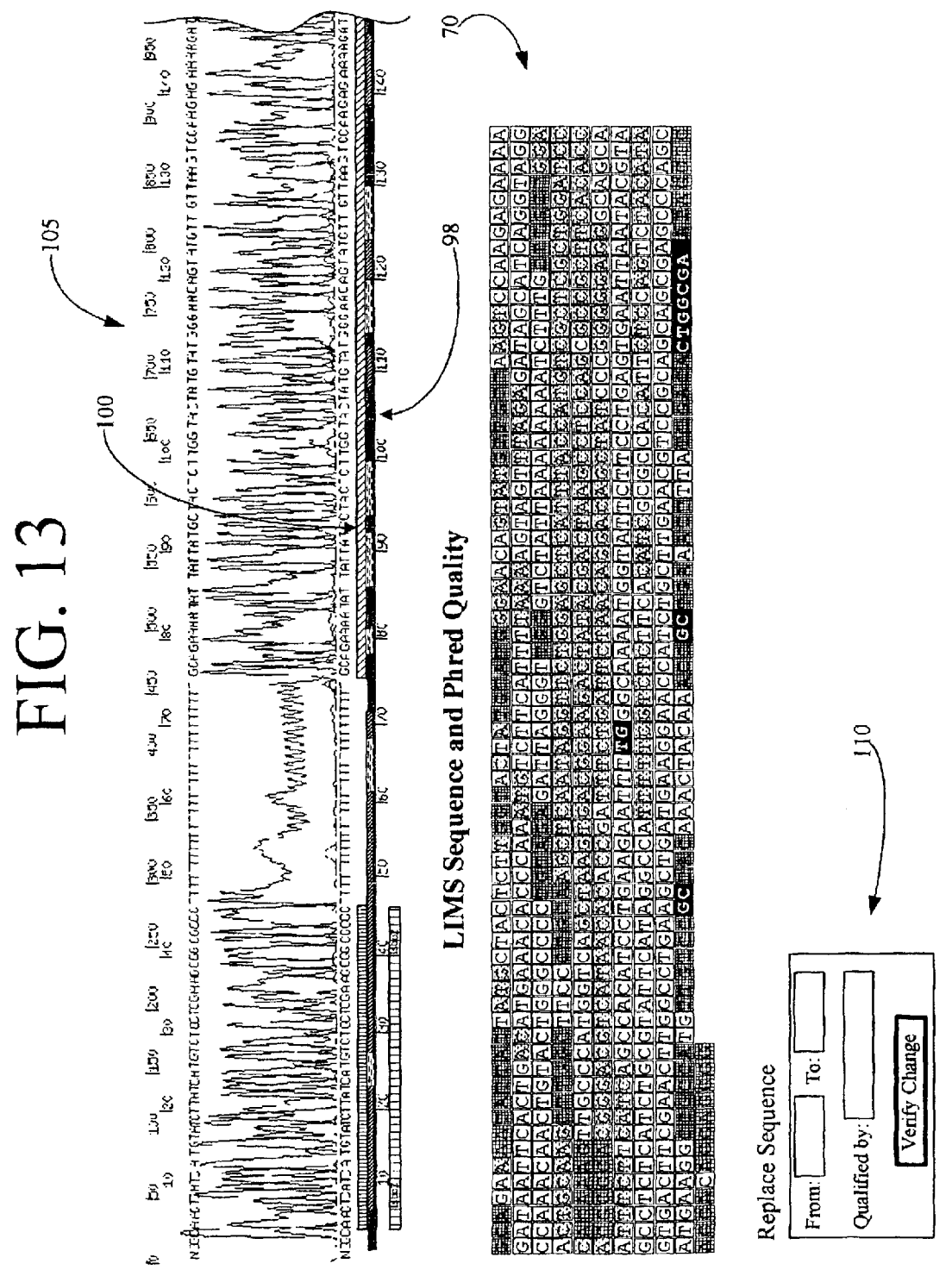

The first button 92 in FIGS. 8A and 9, with the legend Chromatogram, links the user to the screen replicated in FIG. 13. The screen display shown in FIG. 13 includes a replica of a chromatogram 105 outputted from the Sequencer 10 (FIG. 1). Under the chromatogram 105 are two bars or lines 98 and 100 displayed in differing combinations of color and/or grayscale indications. The lower line 98 is a representation of the Phred score for each base in the identified sequence listing. The color or grayscale representations in the line 98 represent the same Phred score indications as shown in the first shaded sequence listing 70 depicted in FIGS. 8A and 9, where the separate colors or grayscale indications provide an indication of the Phred score for the base represented by that portion of the chromatogram just above the two lines 98 and 100. The upper line 100, includes various colors or grayscale indications corresponding again to the base represented by that portion of the chromatogram just above the two lines 98 and 100. Specifically, a first color or grayscale in the upper line 100 indicates that the portion of the sequence represented by the adjacent portions of the chromatogram have a first origin, for instance, the first color or grayscale may represent a known vector used in the gene manipulation procedure that created the DNA fragment being sequenced and analyzed. A second color or gray scale in the line 100 represents the sequence of interest (the trimmed sequence being analyzed, for instance, an unknown sequence). A third color of grayscale indication in the line 100 may represent a poly A tail or other feature that is not necessarily part of the sequence of interest, but is identified by computer analysis as being separate from the sequence of interest. It should be understood that additional colors or grayscale indications may be added to the upper line 100 to aid a researcher in his analysis of the presented data in the interface of the present invention.

Below the chromatogram 105, lines 98 and 100, again is the first shaded sequence listing 70 as depicted in FIGS. 8A and 9. Repeating the first shaded sequence listing 70 allows the researcher or user using the interface of the present invention to confirm and compare the results of the computer analysis of the chromatogram with the original chromatogram 105. Below the first shaded sequence listing 70 is a REPLACE SEQUENCE box 110 where the researcher may enter manually data that may differ from the analysis provided in the interface by the computer. For instance, the researcher enters the start and stop base position that he has determined to be the appropriate trimmed sequence, where the start and stop base positions are determined by the numbered line under the chromatogram 105.

Figure 14:
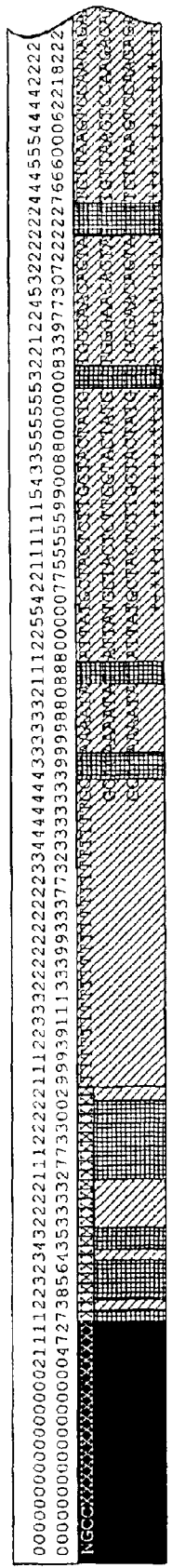
FIG. 14 is a representation of a computer screen display generated in response to the selection of the Explain button shown at the top of FIGS. 8A and 9, where the selection is made by computer digitizer interaction, in accordance with the present invention. This figure also depicts SEQ ID NO: 2.

Returning to FIGS. 8A and 9, the researcher may also select the EXPLAIN button 94, which links to the computer screen display shown in FIG. 14 where details of the computer analysis are displayed. For instance, the EXPLAIN display includes details regarding the computer chromatogram analysis. The EXPLAIN display represents the logical steps of the data analyzer. For instance, the notes provided assist a researcher in understanding any particular decisions or steps taken by the computer in making determinations in data analysis steps. In the steps that produce the trimmed sequence, the computer may decide that a portion bases called from the chromatogram are low quality and therefore were trimmed out of the final trimmed sequence. Such actions are explained in the EXPLAIN display.

Figure 15:
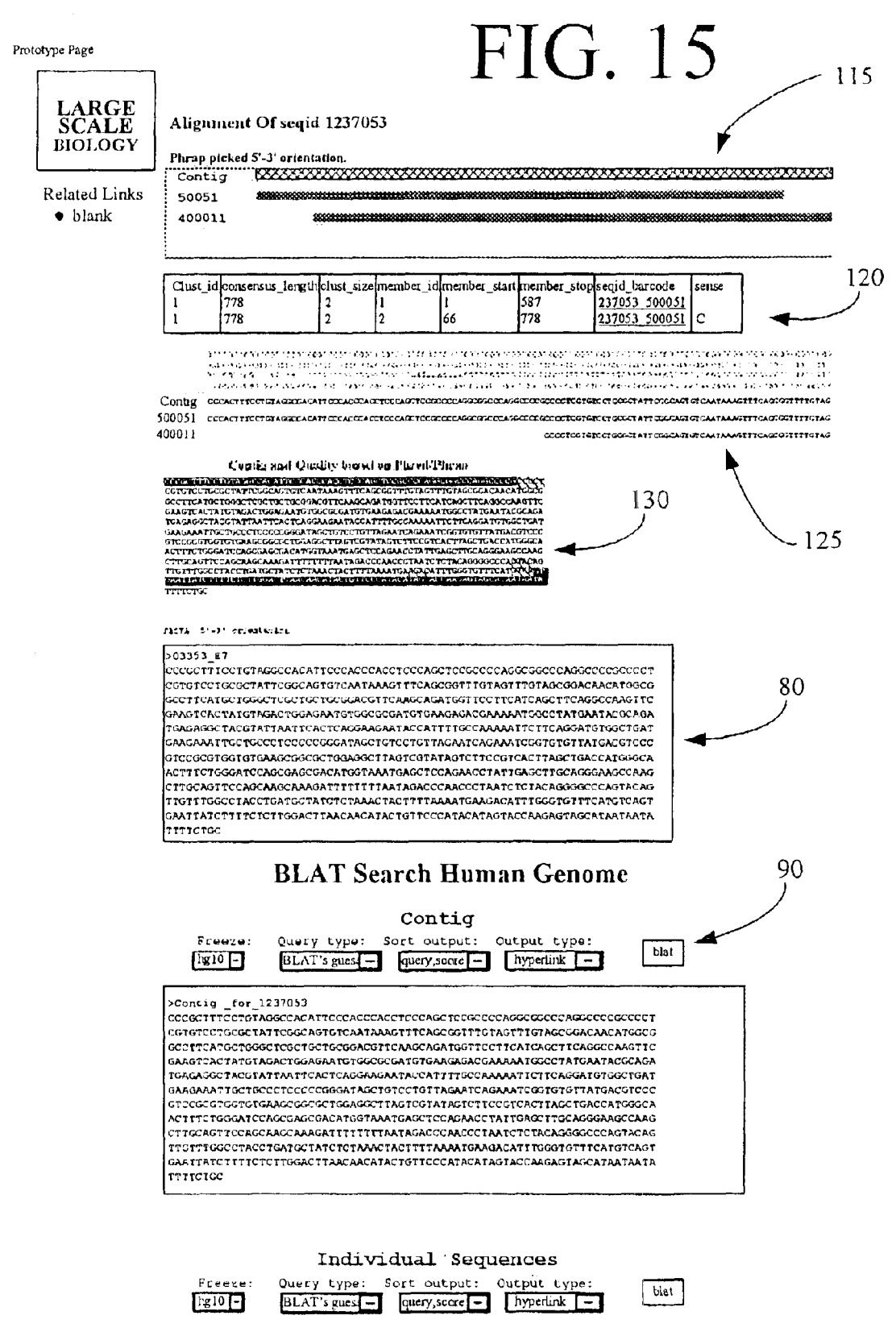

In FIGS. 8A and 9, the researcher may also select the ALIGN SEQIDS button 96, which links to the computer screen display shown in FIG. 15 where results of Phil Green's Phrap software analysis are provided. Specifically, the Phrap software analysis examines a sequence listing and aligns it with larger contiguous segments or contigs. The interface of the present invention takes the results of the Phrap software analysis and generates a visual representation 115 of any overlap (if it exists) between the sequence of interest and other sequence(s) in the local database. For instance, the sequence of interest may align with several sequences analyzed and stored in the database 20 in FIG. 18. One or more aligned sequences may be displayed simultaneously along with the sequence of interest at the top of the display represented in FIG. 15, however, in the example shown, the sequence of interest identified by the seq_ID 1237053 overlaps with only one other sequence, (identified by its own seq_ID) in the database 20. It should be understood that any number of aligning sequences and/or contigs may be displayed in the box 115, although in the example depicted, only two sequences are displayed. At the bottom of the screen display in FIG. 15, a window 90 to the BLAT search is also provided. Further, above the BLAT search window 90, a FASTA representation 80 of the sequence of interest is again provided.

Figure 16:
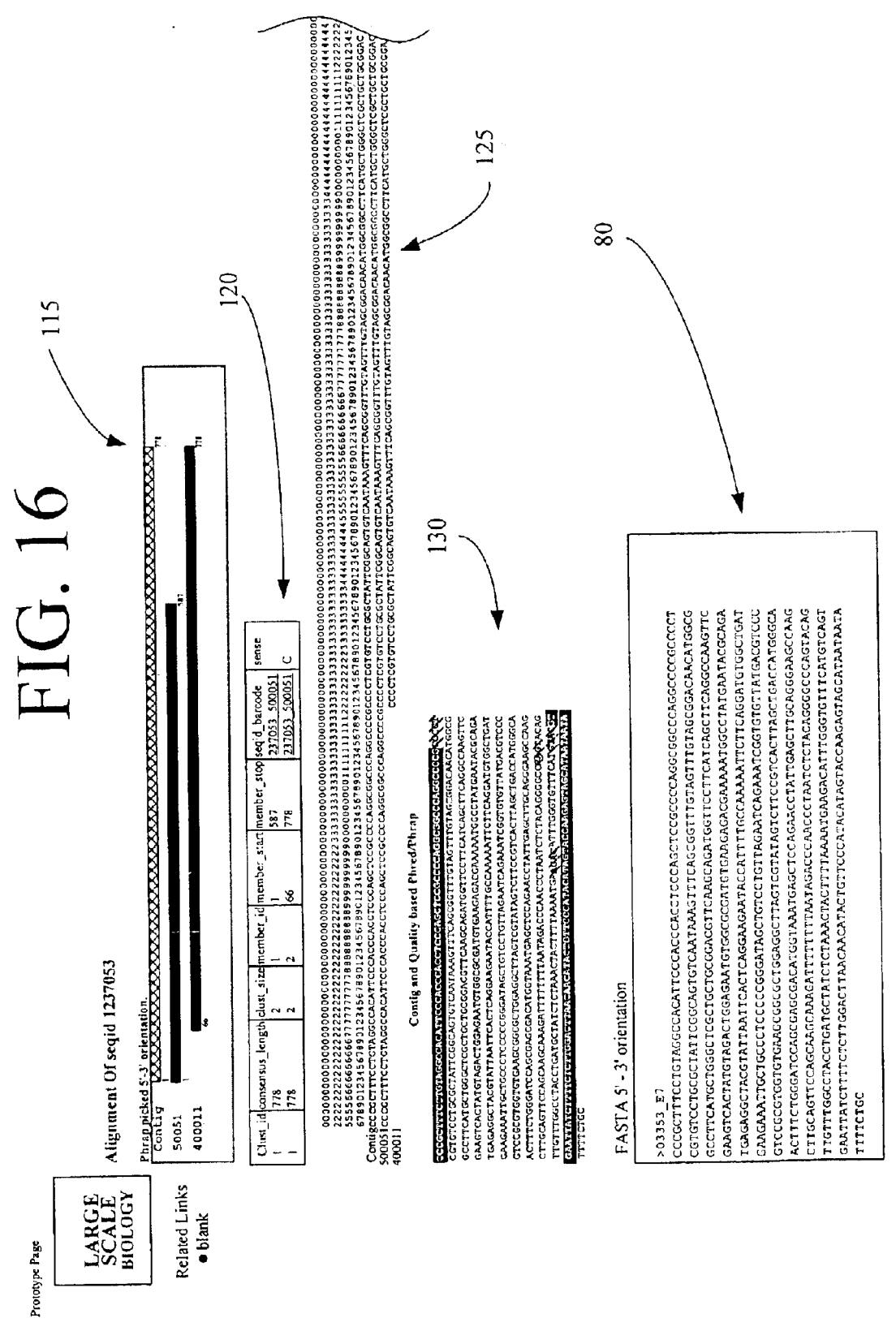

A portion of the display depicted in FIG. 15 is shown again in FIG. 16 on a slightly enlarged scale to provide greater detail. Beneath the visual representation 115 at top of FIGS. 15 and 16, is a Phrap alignment 120 that provides a rendering in table form of the alignment depicted visually in box 115. Beneath the alignment 120, is a textual rendering of the same Phrap alignment information provided in a FASTA-like format. In the box 130, the contig sequence and quality scores produced by Phrap are depicted.

Returning now to the flowchart depicted in FIG. 2, step S1 corresponds to selection or input of an identifier in either of FIG. 4A or 4B. Step S2 indicates computer compilation of the various data necessary for display in the interface of the present invention. Specifically, in step S2, the computers of the LIMS (FIGS. 1 and 18) gather all data related to the sequence or sequences of interest that a researcher selects for review. The data collected includes: well location information relating to each sample in requested well-plate; the chromatogram(s) corresponding to each sample in the well plate(s) requested, the chromatograms being stored either in the database 20 (FIG. 18) or in the data source 2 connected to the data analyzer 15 (FIG. 1); results of Phred analysis; results of Phrap analysis; results of BLAST analysis; and results of BLAT analysis. At this point the computer also converts Phred score in to predetermined color or grayscale schemes for subsequent display.

At step S3 in FIG. 2, portions of the data are compiled and displayed in the well format corresponding to either of FIGS. 6 and 19, depending upon how many well-plates of data were requested by the researcher. At step S4 in FIG. 2, the computer determines whether or not a selection has been made by the researcher. Specifically, from a well 30 in FIG. 7 (or FIG. 6) what has the researcher selected? If different well-plate ID has been selected, control moves to step S7 and a new set of data is compiled in step S2. If a Seq ID has been selected control moves to step S8 and the display depicted in FIGS. 8A, 8B and 9 is generated and displayed on the computer screen of the interface terminal 4, as represented by step S9 in FIG. 2. If the researcher selects a BLAST ID moves to step S5 in FIG. 2, and a link engaged to generate the display depicted in FIG. 17, as represented by step S6 in FIG. 2. If a BLAT search is selected at step S4 in FIG. 2, then control moves to step S13 in FIG. 2, as is described below.

Returning to step S9, in FIG. 2, the display generated and shown in FIGS. 8A, 8B and 9 further includes various choices. If the researcher selects a link in FIG. 8A or 8B the computer determines the selection at step S10 in FIG. 2. For instance, if the researcher selects the EXPLAIN Button 94 in FIG. 8A, as shown at step S12 in FIG. 2, then the explanation data is generated and displayed as shown in FIG. 14. If the researcher selects a BLAT search, control moves to step S13, as is described further below. If the researcher selects the CHROMATOGRAM button 92 in FIG. 8, as indicated at step S17, then the chromatogram related data is used to generate the display depicted in FIG. 13 and further represented at step S18. With the display depicted in FIG. 13, the researcher may edit the data. If the data is edited, then control moves to step S19. If the researcher selects the Align Sequences button in FIG. 8A, as indicated at step S20 in FIG. 2, then the computer compiles the alignment data to generate the display represented in FIGS. 15 and 16. In the display in FIGS. 15 and 16, the researcher may select a different seq_ID for review and evaluation, as indicated at step S22 in FIG. 2, and control returns to step S9 in FIG. 2 and a new display corresponding to FIG. 6 is generated.

Returning to step S13, if a BLAT search is run, then the BLAT search results are displayed, as represented by step S14. The BLAT search results are shown in a display corresponding to the list display depicted in FIG. 10. If one of the entries in the list in FIG. 10 is selected, control moves from step S15 in FIG. 2 to step S16, where the UCSC BLAT browser is displayed, as shown in FIGS. 11 and 12.

The embodiments described herein are merely illustrative of the principles of this invention. Other arrangements and advantages may be devised by one skilled in the art without departing from the spirit or scope of the invention. Accordingly, the invention should be deemed not to be limited to the above detailed description. Various other embodiments and modifications to the embodiments disclosed herein may be made by those skilled in the art without departing from the scope of the following claims.

What is claimed is:

1. A method for presenting and retrieving scientific data associated with a well plate from an automated laboratory information management system comprising:

(a) generating an interactive image of a well plate on a computer screen, the well plate image having a plurality of wells;

(b) generating in each well of the well plate image representations of at least two types of data corresponding to biological samples stored in a corresponding identified well plate;

(c) wherein at least one of the data representations in each well in the well plate image links to sequence information; and (d) wherein in the display of each well image a visual indication is provided corresponding to sequence quality, percentage of good bases in sequence, and length of the sequence.

2. A method for presenting and retrieving scientific data as set forth in claim 1, wherein in said generating step (b) the data representation that links to sequence information is a seq_ID that also identifies the biological sample stored in the corresponding well of the well plate image.

3. A method for presenting and retrieving scientific data as set forth in claim 2, wherein in said generating step (b) a second of the at least two types of data include a background shading in each well indicating one of the following:

a first color or shading indicates that the sample is a control;

a second color or shading indicates that the sequence listing has been verified by computer as good;

a third color or shading indicates that the sequence listing could not be determined because the chromatogram had problems or was unintelligible;

a fourth color or shading indicates that no data is available; and a fifth color indicates that the sequence listing was manually validated by a technician or scientist.

4. A method for presenting and retrieving scientific data as set forth in claim 3, wherein in said generating step (b) a third type of data is displayed in each well, the third type of data being a BLAST ID determined by searching a database.

5. A method for presenting and retrieving scientific data as set forth in claim 4, wherein in said generating step (b) a fourth type of data is displayed in each well, the fourth type of data being a statistical evaluation of the BLAST ID.

6. A method for presenting and retrieving scientific data as set forth in claim 5, wherein in said generating step (b) a fifth type of data is displayed in each well, the fifth type of data being a color or grayscale area indicating a composite Phred score.

7. A method for presenting and retrieving scientific data as set forth in claim 6, wherein in said generating step (b) a sixth type of data is displayed in each well, the sixth type of data being a numeric indication of the length of the sequence in the corresponding well of the well plate image.

8. A method for presenting and retrieving scientific data as set forth in claim 7, wherein in said generating step (b) a seventh type of data is displayed in each well, the seventh type of data being a color or grayscale area linking to a BLAT search engine.

9. A method for presenting and retrieving scientific data as set forth in claim 2, further comprising the step of:

generating a second display in response to selection of the seq_ID, the seq_ID defining the link to the second display; and wherein the second display includes a listing of the identified sequence in FASTA format.

10. A method for presenting and retrieving scientific data as set forth in claim 9, wherein the second display further includes a display of the sequence in FASTA format with background shading, where the background shading for each called base indicates an individual Phred quality score corresponding to that called base.

11. A method for presenting and retrieving scientific data as set forth in claim 9, wherein the second display further includes a display of list of BLAST ID hits.

12. A method for presenting and retrieving scientific data as set forth in claim 9, wherein the second display further includes a search window for conducting a BLAT search, and further includes a link associated with the BLAT search that links to the BLAT search engine.

13. A method for presenting and retrieving scientific data as set forth in claim 9, wherein the second display includes a plurality of links to further displays.

14. A method for presenting and retrieving scientific data as set forth in claim 12, further comprising the step of:

generating a third display in response to selection of one of the link in the second display, the third display including a visual rendering of a chromatogram corresponding the selected seq_ID whose sequence is displayed in the second display.

15. A method for presenting and retrieving scientific data as set forth in claim 13, further comprising the step of:

generating a fourth display in response to selection of one of the links in the second display, the fourth display including a list of explanations corresponding to computer evaluation and processing of the chromatogram and trimming of sequences.

16. A method for presenting and retrieving scientific data as set forth in claim 13, further comprising the step of:

generating a fifth display in response to selection of one of the links in the second display, the fifth display including a visual rendering the selected sequence and alignment of the selected sequence with other sequence or sequences that may have overlapping sequence portions in common.

* * * * *

SEQUENCE LISTING

<160> NUMBER OF SEQ ID NOS: 5

<210> SEQ ID NO 1
<211> LENGTH: 707
<212> TYPE: DNA
<213> ORGANISM: Unknown
<220> FEATURE:
<223> OTHER INFORMATION: Shown in FIGS. 8A and 8B

<400> SEQUENCE: 1

```
gaaaaggaat ggcttgcaga cagaagcttc tagttgagaa gatgaacatt catgttgaga      60
agtggctttc aagttcctac agaagaggtc cacatgtccg tgttcagaga aaggttctgt     120
taaagaactt gtcagataaa acatgccgtg aagagtacag acaagttgac caagtataga     180
agcaaattct ttcttgacaa tgtcagaatc atctttgact ttatctataa gaatcttggg     240
aactctgtta caagaattct gctgctgcaa taagataaaa aatccactaa cacaactagc     300
ccggattact tcatgggagc tctgcagggc ccagttgtaa actgctgttc tccactcaag     360
gaatattctt cttggaaaca gagtcagaag aaacacacat cgtgattgtg cctgtggtga     420
atagctatct gaaatcctac agcttaatgt tagaagatta gcggcaaatg tggtcaactt     480
taaacagccg tcatcagaat gggaataaat ccatggaagt gagagcattc cacataaatc     540
ttccaggata tgatcttcaa atgaactgtt tacttgcata taaatcaaag catcataaat     600
tttcaccacc ttatcaatgg ttgcctccag gtccagtttc tgaacagatt ctaacaaact     660
tctacagctc ttaagcactt ttgtgtaaaa atccaatgac atccaag                   707
```

<210> SEQ ID NO 2
<211> LENGTH: 713
<212> TYPE: DNA
<213> ORGANISM: Unknown
<220> FEATURE:
<223> OTHER INFORMATION: Shown in FIGS. 9, 13 and 14

<400> SEQUENCE: 2

```
gcagaaaata ttattatgct actcttggta ctatgtatgg gaacagtatg ttgttaagtc      60
caagagaaaa gataattcac tgacatgaaa cacccaaatg tcttcatttt aaaagtagtt     120
tagagatagc atcaggtagg ccaaacaact gtactgggcc cctgtagaga ttagggttgg     180
gtctattaaa aaaaatcttt gcttgctgga actgcaagct tggcttccct gcaagctcaa     240
taggttctgg agctcattta ccatgtcgct cgctggatcc cagaaagttg cccatggtca     300
```

-continued

```
gctaagtgac ggaagactat acgactaagc ctccagcgcc gcttcacacc acgcggacgg      360
gacgtcataa cacaccgatt tctgattcta acaggacagc tatcccgggg gagggcagca      420
atttcttcat cagccacatc ctgaagaatt tgggcaaaa tggtattctt cctgagtgaa       480
ttaatacgta gcctctcatc tgcgtattca taggccattt ttcgtctctt cacatcgcgc      540
cacattctcc agtctacata gtgacttcga acttggctg aagctgatga aggaaccatc       600
tgcttgaacg tccgcagcag cgagcccagc atgaaggccg ccatgttgtc cgctacaaac      660
tacaaaccgc tgaaacttta ttgacactgg cgaatagcgc aggacacgag ggg             713
```

<210> SEQ ID NO 3
<211> LENGTH: 655
<212> TYPE: DNA
<213> ORGANISM: Unknown
<220> FEATURE:
<223> OTHER INFORMATION: Shown at top of FIG. 12

<400> SEQUENCE: 3

```
cgctcccttg cttgctcgcg ctttcgctcg ccctctcctc gaggatcgag gggactctga       60
ccacagcctg tggctgggaa gggagacaga ggcggcggcg gctcagggga aacgaggctg      120
cagtggtggt agtaggaaga tgtcgggcga ggacgagcaa caggagcaaa ctatcgctga      180
ggacctggtc gtgaccaagt ataagatggg gggcgacatc gccaacaggg tacttcggtc      240
cttggtggaa gcatctagct caggtgtgtc ggtactgagc ctgtgtgaga aggtgatgc       300 catgattatg gaagaaacag ggaaaatctt caagaaagaa aaggaaatga agaaaggtat      360
tgcttttccc accagcattt cggtaaataa ctgtgtatgt cacttctccc ctttgaagag      420
cgaccaggat tatattctca aggaaggtga cttggtaaaa attgaccttg ggtccatgt       480 ggatggcttc atcgctaatg tagctcacac ttttgtggtt gatgtagctc aggggaccca      540
agtaacaggg aggaaagcag atgttattaa ggcagctcac ctttgtgctg aagctgccct      600
acgcctggtc aaacctggaa atcagaacac acaagtgaca gaagcctgga acaaa           655
```

<210> SEQ ID NO 4
<211> LENGTH: 1700
<212> TYPE: DNA
<213> ORGANISM: Unknown
<220> FEATURE:
<223> OTHER INFORMATION: Shown at bottom of FIG. 12

<400> SEQUENCE: 4

```
cgagagcggc tagagtctgg cggccgagag gactagttgt cccagcgtgc cctgcgcctc       60
agcccgcgcg ctcgcagctt ctcgctctcg cctgcctgcc cgctcccttg cttgctcgcg      120
ctttcgctcg ccctctcctc gaggatcgag gggactctga ccacagcctg tggctgggaa      180
gggagacaga ggcggcggcg gctcagggga aacgaggctg cagtggtggt agtaggaaga      240
tgtcgggcga ggacgagcaa caggagcaaa ctatcgctga ggacctggtc gtgaccaagt      300
ataagatggg gggcgacatc gccaacagtg agtgcggcct cggggtcgg ggaatcaagg       360 ctgataggga aaggtaacag gctggcccgg aaggggctgg agcggagggg tcatgcggac      420
tgagctactg aggggcccgc accggtccgc tgggcacggc gtggtgggaa gacccggtgt      480
cgcgcctggg acctgagcgg gcaggcccag gctgaagtct atggaggtgc gggtcggcga      540
ccaggatgag cgcagagagg ggaccctggc aggctccgac ccgaggccgt ttgttaggag      600
gcaagacgtg ttttctcttg ttcctatcct tcattcccga ttattgcttc ctctgattct      660
```

-continued

```
ggcagcggcg aggccacctc gaaaaggaag cgcccagcta ttggcgacag aagtgcccct     720 ctgttttttgt agcgtctccg gggcgtcagg agccaagccg gcacgtgttg ctgggtccca     780
ttgcggatgg ctggcccct tcttactccg ctagtgtccc tgacaccagc ttccccacca      840
ccagcttccc caccacgtgc tttgctggag cctttccttc tttacttcag ctcttaccct     900
ggtgggggcc cccttctacc ttgggccagc taaggagacc gttggagagc actcctggag     960
cttctaatgc aagtcttgga gatatatatg ctttcttg aagttactca ttactaccac      1020 cttttccaatc tgtgcagata gtcttagtta gcattacat ttgttgttct cagtgacttg     1080
acaactcaaa tgttttgggg tctccgtctt atcccaacta ggcaagcttg tgaacattac     1140
tggaaaaggg aggactgatt ttaggatttt cacaagtcat ccttactcca ggtgtgctct    1200
gacgatctca gcagttgcct gtcactctag gcagatgcca cttttctcttt tctctctttc    1260 cagttagcct ttccatttta ttccagttag ggagatacaa actgcttgtc attgtgcttt     1320
taaatggttt taacagcaaa gatggtgggg aacaggtatt taggatgcct cccgtcctgt     1380
gggtgaaaat ctgagtttta ccagctttca aagaatcacc aaaactgaga taccaaaagt    1440
caaacctgtg ctttatatca cagtggacat ttagtatcgt accctggttt ttggtgcctt    1500
ttagtatttg agatactagt ggtttgaatc agaaaatctc ttacagttta taactttggc    1560
ctcatatttc ttttagataa gccatgatcc cccgaaatga aacccaggga ccttagatta    1620
agtttccttg gcttatgcac ttgtttatga ggaaataagt ctatatagat tgagattcct    1680
aacacctaat tagagtgtct                                                 1700
```

<210> SEQ ID NO 5
<211> LENGTH: 778
<212> TYPE: DNA
<213> ORGANISM: Unknown
<220> FEATURE:
<223> OTHER INFORMATION: Shown in FIGS. 15 and 16.

<400> SEQUENCE: 5

```
cccgctttcc tgtaggccac attcccaccc acctcccagc tccgcccag gcggcccagg       60 ccccgcccct cgtgtcctgc gctattcggc agtgtcaata agtttcagc ggtttgtagt      120 ttgtagcgga caacatggcg gccttcatgc tgggctcgct gctgcggacg ttcaagcaga     180
tggttccttc atcagcttca ggccaagttc gaagtcacta tgtagactgg agaatgtggc    240
gcgatgtgaa gagacgaaaa atggcctatg aatacgcaga tgagaggcta cgtattaatt    300
cactcaggaa gaataccatt ttgccaaaaa ttcttcagga tgtggctgat gaagaaattg    360
ctgccctccc ccgggatagc tgtcctgtta gaatcagaaa tcggtgtgtt atgacgtccc    420
gtccgcgtgg tgtgaagcgg cgctggaggc ttagtcgtat agtcttccgt cacttagctg    480
accatgggca actttctggg atccagcgag cgacatggta aatgagctcc agaacctatt    540
gagcttgcag ggaagccaag cttgcagttc agcaagcaa agatttttttt taatagaccc    600 aaccctaatc tctacagggg cccagtacag ttgtttggcc tacctgatgc tatctctaaa    660
ctacttttaa aatgaagaca tttgggtgtt tcatgtcagt gaattatctt ttctcttgga    720
cttaacaaca tactgttccc atacatagta ccaagagtag cataataata ttttctgc      778
```